(12) United States Patent
Cheng et al.

(10) Patent No.: US 10,318,663 B2
(45) Date of Patent: Jun. 11, 2019

(54) METHOD OF RESERVOIR COMPARTMENT ANALYSIS USING TOPOLOGICAL STRUCTURE IN 3D EARTH MODEL

(75) Inventors: Yao-Chou Cheng, Houston, TX (US); Hendrik Braaksma, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 678 days.

(21) Appl. No.: 13/997,948

(22) PCT Filed: Dec. 6, 2011

(86) PCT No.: PCT/US2011/063359
§ 371 (c)(1),
(2), (4) Date: Jun. 25, 2013

(87) PCT Pub. No.: WO2012/102784
PCT Pub. Date: Aug. 2, 2012

(65) Prior Publication Data
US 2013/0338987 A1    Dec. 19, 2013

Related U.S. Application Data

(60) Provisional application No. 61/436,462, filed on Jan. 26, 2011.

(51) Int. Cl.
*G01V 1/34* (2006.01)
*G06F 17/50* (2006.01)
(Continued)

(52) U.S. Cl.
CPC .......... *G06F 17/5009* (2013.01); *G01V 1/345* (2013.01); *G01V 99/005* (2013.01);
(Continued)

(58) Field of Classification Search
CPC ..... G06F 19/26; G06F 9/5072; G01V 99/005; G01V 1/50; G06T 17/00
(Continued)

(56) References Cited

U.S. PATENT DOCUMENTS 4,794,534 A    12/1988   Millheim
5,468,088 A    11/1995   Shoemaker et al.
(Continued)

FOREIGN PATENT DOCUMENTS

EP    1036341    2/2005
EP    1230566    2/2005
(Continued)

OTHER PUBLICATIONS

Peer-Timo Bremer, NPL, "Maximizing Adaptivity in Hierarchical Topological Models", Mar. 2005 (google).*
(Continued)

*Primary Examiner* — Kibrom K Gebresilassie
(74) *Attorney, Agent, or Firm* — ExxonMobil Upstream Research Company—Law Department

(57) ABSTRACT

There is provided a system and method for automatically identifying potential compartments of a reservoir based on the reservoirs geological structure. A method of identifying compartments of a reservoir structure includes obtaining structural data corresponding to a geological structure of a reservoir. The method also includes generating a topological net based on the structural data, the topological net comprising critical points and poly segments connecting the critical points. The method also includes identifying potential compartments of the reservoir structure based on the topological net. The method also includes identifying spill or break-over relationships among the potential compartments based on the topological net.

24 Claims, 13 Drawing Sheets

(51) Int. Cl.
*G01V 99/00* (2009.01)
*G06T 17/05* (2011.01)
*G06T 11/20* (2006.01)

(52) U.S. Cl.
CPC ............ *G06T 11/206* (2013.01); *G06T 17/05* (2013.01); *G01V 2210/644* (2013.01); *G01V 2210/66* (2013.01); *G06F 2217/16* (2013.01)

(58) Field of Classification Search
USPC ...................................................... 703/9, 10
See application file for complete search history.

(56) References Cited

U.S. PATENT DOCUMENTS

| | | | |
|---|---|---|---|
| 5,708,764 | A | 1/1998 | Borrel et al. |
| 5,905,657 | A | 5/1999 | Celniker |
| 5,966,141 | A | 10/1999 | Ito et al. |
| 5,992,519 | A | 11/1999 | Ramakrishnan et al. |
| 6,002,985 | A | 12/1999 | Stephenson |
| 6,035,255 | A | 3/2000 | Murphy et al. |
| 6,044,328 | A | 3/2000 | Murphy et al. |
| 6,049,758 | A | 4/2000 | Bunks et al. |
| 6,070,125 | A | 5/2000 | Murphy et al. |
| 6,101,447 | A | 8/2000 | Poe, Jr. |
| 6,219,061 | B1 | 4/2001 | Lauer et al. |
| 6,236,942 | B1 | 5/2001 | Bush |
| 6,236,994 | B1 | 5/2001 | Swartz et al. |
| 6,323,863 | B1 | 11/2001 | Shinagawa et al. |
| 6,353,677 | B1 | 3/2002 | Pfister et al. |
| 6,373,489 | B1 | 4/2002 | Lu et al. |
| 6,438,069 | B1 | 8/2002 | Ross et al. |
| 6,490,528 | B2 | 12/2002 | Cheng et al. |
| 6,516,274 | B2 | 2/2003 | Cheng et al. |
| 6,519,568 | B1 | 2/2003 | Harvey et al. |
| 6,529,833 | B2 | 3/2003 | Fanini et al. |
| 6,549,854 | B1 | 4/2003 | Malinvemo et al. |
| 6,549,879 | B1 | 4/2003 | Cullick et al. |
| 6,612,382 | B2 | 9/2003 | King |
| 6,643,656 | B2 | 11/2003 | Peterson |
| 6,715,551 | B2 | 4/2004 | Curtis et al. |
| 6,757,613 | B2 | 6/2004 | Chapman et al. |
| 6,765,570 | B1 | 7/2004 | Cheung et al. |
| 6,766,254 | B1 | 7/2004 | Bradford et al. |
| 6,772,066 | B2 | 8/2004 | Cook |
| 6,823,266 | B2 | 11/2004 | Czernuszenko et al. |
| 6,826,483 | B1 | 11/2004 | Anderson et al. |
| 6,823,732 | B2 | 12/2004 | Haarstad |
| 6,829,570 | B1 | 12/2004 | Thambynayagam et al. |
| 6,912,467 | B2 | 6/2005 | Schuette |
| 6,912,468 | B2 | 6/2005 | Marin et al. |
| 6,978,210 | B1 | 12/2005 | Suter et al. |
| 6,980,939 | B2 | 12/2005 | Dhir et al. |
| 6,980,940 | B1 | 12/2005 | Gurpinar et al. |
| 6,993,434 | B2 | 1/2006 | Cheng et al. |
| 7,003,439 | B2 | 2/2006 | Aldred et al. |
| 7,027,925 | B2 | 4/2006 | Terentyev et al. |
| 7,031,842 | B1 | 4/2006 | Musat et al. |
| 7,035,255 | B2 | 4/2006 | Tzeng |
| 7,047,170 | B2 | 5/2006 | Feldman et al. |
| 7,050,953 | B2 | 5/2006 | Chiang et al. |
| 7,054,752 | B2 | 5/2006 | Zabalza-Mezghani et al. |
| 7,079,953 | B2 | 7/2006 | Thorne et al. |
| 7,085,696 | B2 | 8/2006 | King |
| 7,089,167 | B2 | 8/2006 | Poe |
| 7,096,172 | B2 | 8/2006 | Colvin et al. |
| 7,098,908 | B2 | 8/2006 | Acosta et al. |
| 7,109,717 | B2 | 9/2006 | Constable |
| 7,136,064 | B2 | 11/2006 | Zuiderveld |
| 7,181,380 | B2 | 2/2007 | Dusterhoft et al. |
| 7,203,342 | B2 | 4/2007 | Pedersen |
| 7,225,078 | B2 | 5/2007 | Shelley et al. |
| 7,248,258 | B2 | 7/2007 | Acosta et al. |
| 7,278,496 | B2 | 10/2007 | Leuchtenberg |
| 7,280,932 | B2 | 10/2007 | Zoraster et al. |
| 7,281,213 | B2 | 10/2007 | Callegari |
| 7,283,941 | B2 | 10/2007 | Horowitz et al. |
| 7,298,376 | B2 | 11/2007 | Chuter |
| 7,314,588 | B2 | 1/2008 | Blankenship |
| 7,328,107 | B2 | 2/2008 | Strack et al. |
| 7,330,791 | B2 | 2/2008 | Kim et al. |
| 7,337,067 | B2 | 2/2008 | Sanstrom |
| 7,340,347 | B2 | 3/2008 | Shiny et al. |
| 7,343,275 | B2 | 3/2008 | Lenormand et al. |
| 7,362,329 | B2 | 4/2008 | Zuiderveld |
| 7,363,866 | B2 | 4/2008 | Gnedenko et al. |
| 7,366,616 | B2 | 4/2008 | Bennett et al. |
| 7,367,411 | B2 | 5/2008 | Leuchtenberg |
| 7,395,252 | B2 | 7/2008 | Anderson et al. |
| 7,409,438 | B2 | 8/2008 | McConnell et al. |
| 7,412,363 | B2 | 8/2008 | Callegari |
| 7,437,358 | B2 | 10/2008 | Arrouye et al. |
| 7,451,066 | B2 | 11/2008 | Edwards et al. |
| 7,458,062 | B2 | 11/2008 | Coulthard et al. |
| 7,460,957 | B2 | 12/2008 | Prange et al. |
| 7,478,024 | B2 | 1/2009 | Gurpinar et al. |
| 7,512,543 | B2 | 3/2009 | Raghuraman et al. |
| 7,519,976 | B2 | 4/2009 | Blevins |
| 7,539,625 | B2 | 5/2009 | Klumpen et al. |
| 7,548,873 | B2 | 6/2009 | Veeningen et al. |
| 7,565,243 | B2 | 7/2009 | Kim et al. |
| 7,576,740 | B2 | 8/2009 | Dicken |
| 7,596,481 | B2 | 9/2009 | Zamora et al. |
| 7,603,264 | B2 | 10/2009 | Zamora et al. |
| 7,606,666 | B2 | 10/2009 | Repin et al. |
| 7,616,213 | B2 | 11/2009 | Chuter |
| 7,620,534 | B2 | 11/2009 | Pita et al. |
| 7,627,430 | B2 | 12/2009 | Hawtin |
| 7,630,914 | B2 | 12/2009 | Veeningen et al. |
| 7,652,779 | B2 | 1/2010 | Wu et al. |
| 7,657,407 | B2 | 2/2010 | Logan |
| 7,657,414 | B2 | 2/2010 | Zamora et al. |
| 7,657,494 | B2 | 2/2010 | Wilkinson et al. |
| 7,668,700 | B2 | 2/2010 | Erignac et al. |
| 7,672,826 | B2 | 3/2010 | Chen et al. |
| 7,684,929 | B2 | 3/2010 | Prange et al. |
| 7,711,550 | B1 | 5/2010 | Feinberg et al. |
| 7,716,028 | B2 | 5/2010 | Montaron et al. |
| 7,716,029 | B2 | 5/2010 | Couet et al. |
| 7,725,302 | B2 | 5/2010 | Ayan et al. |
| 7,739,089 | B2 | 6/2010 | Gurpinar et al. |
| 7,743,006 | B2 | 6/2010 | Woronow et al. |
| 7,752,022 | B2 | 7/2010 | Fomel et al. |
| 7,778,811 | B2 | 8/2010 | Kelfoun |
| 7,796,468 | B2 | 9/2010 | Kellogg |
| 7,814,989 | B2 | 10/2010 | Nikolakis-Mouchas et al. |
| 7,876,705 | B2 | 1/2011 | Gurpinar et al. |
| 7,878,268 | B2 | 2/2011 | Chapman et al. |
| 7,886,285 | B2 | 2/2011 | Asselin et al. |
| 7,899,657 | B2 | 3/2011 | Martine |
| 7,913,190 | B2 | 3/2011 | Grimaud et al. |
| 7,925,483 | B2 | 4/2011 | Xia et al. |
| 7,925,695 | B2 | 4/2011 | McConnell et al. |
| 7,953,585 | B2 | 5/2011 | Gurpinar et al. |
| 7,953,587 | B2 | 5/2011 | Bratton et al. |
| 7,970,545 | B2 | 6/2011 | Sanstrom |
| 7,986,319 | B2 | 7/2011 | Dommisse et al. |
| 7,991,600 | B2 | 8/2011 | Callegari |
| 7,995,057 | B2 | 8/2011 | Chuter |
| 8,005,658 | B2 | 8/2011 | Tilke et al. |
| 8,044,602 | B2 | 10/2011 | Smith |
| 8,055,026 | B2 | 11/2011 | Pedersen |
| 8,064,684 | B2 | 11/2011 | Ratti et al. |
| 8,073,664 | B2 | 12/2011 | Schottle et al. |
| 8,094,515 | B2 | 1/2012 | Miller et al. |
| 8,103,493 | B2 | 1/2012 | Sagert et al. |
| 8,145,464 | B2 | 3/2012 | Arnegaard et al. |
| 8,155,942 | B2 | 4/2012 | Sarma et al. |
| 8,199,166 | B2 | 6/2012 | Repin et al. |
| 8,204,728 | B2 | 6/2012 | Schottle et al. |
| 8,249,844 | B2 | 8/2012 | Dale et al. |
| 8,259,126 | B2 | 9/2012 | Chuter |
| 8,280,635 | B2 | 10/2012 | Ella et al. |
| 8,296,720 | B2 | 10/2012 | Coulthard et al. |

(56) References Cited

U.S. PATENT DOCUMENTS

| | | |
|---|---|---|
| 8,301,426 B2 | 10/2012 | Abasov et al. |
| 8,325,179 B2 | 12/2012 | Murray et al. |
| 8,346,695 B2 | 1/2013 | Pepper et al. |
| 8,364,404 B2 | 1/2013 | Legendre et al. |
| 8,381,815 B2 | 2/2013 | Karanikas |
| 8,392,163 B2 | 3/2013 | Liu |
| 8,427,904 B2 | 4/2013 | Miller et al. |
| 8,560,476 B2 | 10/2013 | Anderson et al. |
| 8,578,000 B2 | 11/2013 | Van Wie et al. |
| 8,598,882 B2 | 12/2013 | Meeks |
| 8,638,328 B2 | 1/2014 | Lin |
| 8,727,017 B2 | 5/2014 | Hilliard et al. |
| 8,736,600 B2 | 5/2014 | Lin et al. |
| 8,751,208 B2 | 6/2014 | Brouwer et al. |
| 8,797,319 B2 | 8/2014 | Lin |
| 8,803,878 B2 | 8/2014 | Andersen et al. |
| 8,812,334 B2 | 8/2014 | Givens et al. |
| 8,849,639 B2 | 9/2014 | Brown et al. |
| 8,849,640 B2 | 9/2014 | Holl et al. |
| 8,868,540 B2 | 10/2014 | Ture et al. |
| 8,884,964 B2 | 11/2014 | Holl et al. |
| 8,931,580 B2 | 1/2015 | Cheng et al. |
| 9,026,417 B2 | 5/2015 | Sequeira, Jr. et al. |
| 9,047,689 B2 | 6/2015 | Stolte et al. |
| 9,593,558 B2 * | 3/2017 | Sequeira, Jr. ............... E21B 7/04 |
| 9,874,648 B2 * | 1/2018 | Braaksma ............... G01V 1/345 |
| 2001/0006387 A1 | 7/2001 | Bennis et al. |
| 2002/0049575 A1 | 4/2002 | Jalali et al. |
| 2002/0067373 A1 | 6/2002 | Roe et al. |
| 2002/0177955 A1 | 11/2002 | Jalali et al. |
| 2003/0072907 A1 | 4/2003 | Lerner et al. |
| 2003/0078794 A1 | 4/2003 | Knapp |
| 2004/0012670 A1 | 1/2004 | Zhang |
| 2004/0153298 A1 | 8/2004 | Colvin et al. |
| 2004/0220788 A1 | 11/2004 | Assa et al. |
| 2005/0002571 A1 | 1/2005 | Hiraga et al. |
| 2005/0119959 A1 | 6/2005 | Eder |
| 2005/0120242 A1 | 6/2005 | Mayer et al. |
| 2005/0171700 A1 | 8/2005 | Dean |
| 2005/0199391 A1 | 9/2005 | Cudmore et al. |
| 2006/0085174 A1 | 4/2006 | Hemanthkumar |
| 2006/0224423 A1 | 10/2006 | Sun et al. |
| 2006/0235666 A1 | 10/2006 | Assa et al. |
| 2006/0247903 A1 | 11/2006 | Schottle |
| 2006/0265508 A1 | 11/2006 | Angel et al. |
| 2007/0076044 A1 | 4/2007 | Corley, Jr. et al. |
| 2007/0088707 A1 | 4/2007 | Durgin et al. |
| 2007/0100703 A1 | 5/2007 | Noda |
| 2007/0185696 A1 | 8/2007 | Moran et al. |
| 2007/0199721 A1 | 8/2007 | Givens et al. |
| 2007/0266082 A1 | 11/2007 | McConnell et al. |
| 2007/0294034 A1 | 12/2007 | Bratton et al. |
| 2008/0088621 A1 | 4/2008 | Grimaud et al. |
| 2008/0109490 A1 | 5/2008 | Arnegaand et al. |
| 2008/0120076 A1 | 5/2008 | Thambynayagam et al. |
| 2008/0165185 A1 | 7/2008 | Smith et al. |
| 2008/0165186 A1 | 7/2008 | Lin |
| 2008/0243749 A1 | 10/2008 | Pepper et al. |
| 2008/0289877 A1 | 11/2008 | Nikolakis-Mouchas et al. |
| 2008/0297510 A1 | 12/2008 | Callegari |
| 2008/0306803 A1 | 12/2008 | Vaal et al. |
| 2009/0027380 A1 | 1/2009 | Rajan et al. |
| 2009/0027385 A1 | 1/2009 | Smith |
| 2009/0037114 A1 | 2/2009 | Peng et al. |
| 2009/0043507 A1 | 2/2009 | Dommisse et al. |
| 2009/0070086 A1 | 3/2009 | Le Ravalec et al. |
| 2009/0089028 A1 | 4/2009 | Sagert et al. |
| 2009/0125362 A1 | 5/2009 | Reid et al. |
| 2009/0132170 A1 | 5/2009 | Krueger et al. |
| 2009/0157367 A1 | 6/2009 | Meyer et al. |
| 2009/0182541 A1 | 7/2009 | Crick et al. |
| 2009/0198447 A1 | 8/2009 | Legendre et al. |
| 2009/0200014 A1 | 8/2009 | Schottle et al. |
| 2009/0222742 A1 | 9/2009 | Pelton et al. |
| 2009/0229819 A1 | 9/2009 | Repin et al. |
| 2009/0240564 A1 | 9/2009 | Boerries et al. |
| 2009/0295792 A1 | 12/2009 | Liu et al. |
| 2009/0299709 A1 * | 12/2009 | Liu .......................... G01V 1/34 703/6 |
| 2009/0303233 A1 | 12/2009 | Lin et al. |
| 2009/0319243 A1 | 12/2009 | Suarez-Rivera et al. |
| 2010/0013831 A1 | 1/2010 | Gilje et al. |
| 2010/0053161 A1 | 3/2010 | Chuter |
| 2010/0125349 A1 | 5/2010 | Abasov et al. |
| 2010/0132450 A1 | 6/2010 | Pomerantz et al. |
| 2010/0161292 A1 | 6/2010 | Shook et al. |
| 2010/0161300 A1 | 6/2010 | Yeten et al. |
| 2010/0169018 A1 | 7/2010 | Brooks |
| 2010/0171740 A1 | 7/2010 | Andersen et al. |
| 2010/0172209 A1 | 7/2010 | Miller et al. |
| 2010/0174489 A1 | 7/2010 | Bryant et al. |
| 2010/0179797 A1 | 7/2010 | Cullick et al. |
| 2010/0185395 A1 | 7/2010 | Pirovolou et al. |
| 2010/0191516 A1 | 7/2010 | Benish et al. |
| 2010/0206559 A1 | 8/2010 | Sequeira, Jr. et al. |
| 2010/0214870 A1 | 8/2010 | Pepper et al. |
| 2010/0225642 A1 | 9/2010 | Murray et al. |
| 2010/0235154 A1 * | 9/2010 | Meurer .................. G01V 11/00 703/10 |
| 2010/0252270 A1 | 10/2010 | Kim et al. |
| 2010/0271232 A1 | 10/2010 | Clark et al. |
| 2010/0283788 A1 | 11/2010 | Rothnemer et al. |
| 2010/0286917 A1 | 11/2010 | Hazlett et al. |
| 2010/0299125 A1 | 11/2010 | Ding et al. |
| 2010/0307742 A1 | 12/2010 | Phillips et al. |
| 2011/0002194 A1 * | 1/2011 | Imhof ..................... G01V 1/32 367/53 |
| 2011/0022435 A1 | 1/2011 | Reid et al. |
| 2011/0029293 A1 | 2/2011 | Petty et al. |
| 2011/0040533 A1 | 2/2011 | Terrens et al. |
| 2011/0040536 A1 | 2/2011 | Levitan |
| 2011/0044532 A1 | 2/2011 | Holl et al. |
| 2011/0054857 A1 | 3/2011 | Moguchaya |
| 2011/0060572 A1 | 3/2011 | Brown et al. |
| 2011/0063292 A1 * | 3/2011 | Holl ..................... E21B 49/00 345/420 |
| 2011/0074766 A1 | 3/2011 | Page et al. |
| 2011/0099547 A1 | 4/2011 | Banga |
| 2011/0106514 A1 | 5/2011 | Omeragic et al. |
| 2011/0107246 A1 | 5/2011 | Vik |
| 2011/0112802 A1 | 5/2011 | Wilson et al. |
| 2011/0115787 A1 | 5/2011 | Kadlec |
| 2011/0126192 A1 | 5/2011 | Frost et al. |
| 2011/0153300 A1 | 6/2011 | Holl et al. |
| 2011/0157235 A1 | 6/2011 | FitzSimmons |
| 2011/0161133 A1 | 6/2011 | Staveley et al. |
| 2011/0168391 A1 | 7/2011 | Saleri et al. |
| 2011/0175899 A1 | 7/2011 | Bittar et al. |
| 2012/0137281 A1 | 5/2012 | Kleiner et al. |
| 2012/0150449 A1 | 6/2012 | Dobin |
| 2012/0166166 A1 | 6/2012 | Czernuszenko |
| 2012/0285701 A1 * | 11/2012 | Cheng .................... E21B 43/30 166/369 |
| 2013/0064040 A1 * | 3/2013 | Imhof ..................... G01V 1/30 367/73 |
| 2013/0112407 A1 | 5/2013 | Cheng et al. |
| 2013/0140037 A1 * | 6/2013 | Sequeira, Jr. ............. E21B 7/04 166/369 |
| 2013/0317798 A1 | 11/2013 | Cheng et al. |
| 2013/0338984 A1 * | 12/2013 | Braaksma ............... G01V 1/345 703/10 |
| 2013/0338987 A1 | 12/2013 | Cheng et al. |
| 2014/0278117 A1 | 9/2014 | Dobin et al. |
| 2014/0365192 A1 | 12/2014 | Cheng et al. |
| 2015/0049084 A1 | 2/2015 | Cheng et al. |
| 2015/0094994 A1 | 4/2015 | Sequeira, Jr. et al. |
| 2016/0003008 A1 * | 1/2016 | Uribe ..................... E21B 43/00 175/50 |

FOREIGN PATENT DOCUMENTS

| | | |
|---|---|---|
| WO | 2000/014574 | 3/2000 |
| WO | 2008/121950 | 10/2008 |

(56) References Cited

FOREIGN PATENT DOCUMENTS

| WO | 2009/039422 | 3/2009 |
|---|---|---|
| WO | 2009/148681 | 12/2009 |
| WO | 2011/038221 | 3/2011 |

OTHER PUBLICATIONS

P. Vrolijk, B. James, R. Myers, J. Maynard, L. Sumpter, and M. Sweet, "Reservoir Connectivity Analysis-Defining Reservoir Connections and Plumbing", SPE 93577, pp. 1-23, 2005.*

Bremer et al, "Maximizing Adaptivity in Hierarchical topology Models using Extrema Trees" Department of Computer Science, 18 pgs, 2005.*

P. Vrolijk, B. James, R. Myers, J. Maynard, L. Sumpter, and M. Sweet, "Reservoir Connectivity Analysis-Defining Reservoir Connections and Plumbing", pp. 1-23, 2005.*

P. T. Bremer, V. Pascucci, and B. Hamann, "Maximizing Adaptivity in Hierarchical topology Models using Extrema Trees", pp. 1-18, 2005.*

International Search Report and Written Opinion for corresponding PCT Application No. PCT/US2011/63359 dated Apr. 19, 2012, (14 pages).

Bremer et al, "Maximizing Adaptivity in Hierarchical Topological Models Using Extrema Trees," Department of Computer Science, 18 pp.

Gyulassy et al., "A Topological Approach to Simplification of Three-dimensional Scalar Functions," IEEE Transactions on Visualization and Cumputer Graphics, pp. 1-13.

Weber et al., "Topology-controlled Volume Rendering," IEEE, pp. 1-13.

Carr et al., Contour Tree Simplification With Local Geometric Measures, Dept. of Computer Science University College Dublin, (2 pages).

Stephen Smale, "Morse Inequalities for a Dynamical System", Bulletin of American Mathematical Society, 66, 43-491960.

Y.I.Gingold et al., "Control-topology Filtering", Computer-Aided Design (2007), 9 pages.

Michael Sweet et al., Genesis Field, Gulf of Mexico: Recognizing Reservoir Compartments on Geologic and Production Time Scales in Deep-Water Reservoirs, AAPG Bulletin) (Dec. 2007) pp. 1701-1729).

M. Ellen Meurer et al., "Reservoir Connectivity: Definitions, Strategies and Applications", AAPG Search and Discovery (2008).

Bharat, K, et al. (2001), "Who Links to Whom. Mining Linkage Between Web sites", *Proceedings of the 2001 IEE Int'l Conf. on Data Mining*, pp. 51-58.

Cabral, B., et al (1995). "Accelerated vol. Rendering and Tomographic Reconstruction Using Texture Mapping Hardware", *IEEE in Symposium on Volume Visualization*, pp. 91-98, 131.

Crawfis, R., et al. (1992), "Direct Volume Visualization of Three-Dimensional Vector Fields", *Proceedings of the 1992 Workshop on Volume Visualization*, pp. 55-60.

Dhillon, S. (2008), "Managing License Incompatibilities Distributing Eclipse Application Stacks", Thesis, pp. 1-116.

Drebin, R., et al. (1988), "Volume Rendering" *Computer Graphics, the Proceedings of 1988 SIGGRAPH Conference*, vol. 22, No. 4, pp. 65-74.

Lorensen, W., et al., (1987), "Marching Cubes: A High-Resolution 3D Surface Construction Algorithm", *Computer Graphics, The Proceeding of 1987 SIGGRAPH Conference*, vol. 21, No. 4, pp. 163-169.

McCann, P., et al. (2003), "Horizontal Well Path Planning and Correction Using Optimization Techniques," *J. of Energy Resources Tech*. 123, pp. 187-193.

Mugerin. C., et al. (2002), "Well Design Optimization: Implementation in GOCAD," $22^{nd}$ Gocade Meeting, Jun. 2002 pp. 1-14.

Rainaud, J.F., et al. (2004), "WOG—Well Optimization by Geosteering: A Pilot Software for Cooperative Modeling on Internet," *Oil & Gas Science & Tech*. 59(4), pp. 427-445.

Reed, P., et al. (2003) "Simplifying Multiobjective Optimization Using Genetic Algorithms," Proceedings of World Water and Environmental Resources Congress, 10 pgs.

Udoh, E., et at (2003), "Applications of Strategic Optimization Techniques to Development and Management of Oil and Gas Resources", $27^{th}$ SPE Meeting, 16 pgs.

* cited by examiner

200

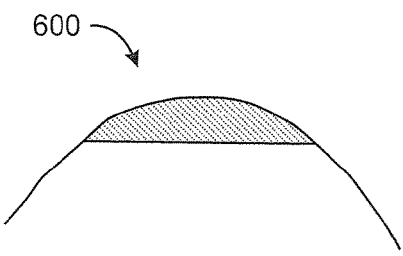
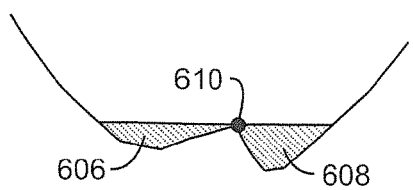
FIG. 6A　　　　　　　　FIG. 6B
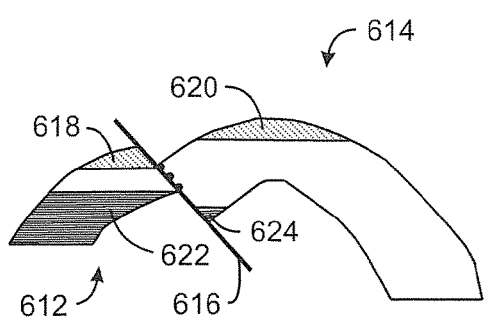
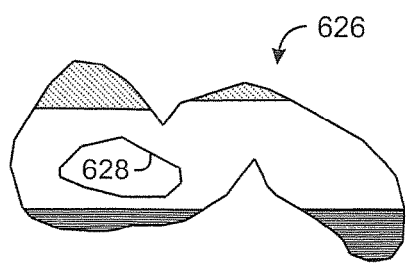
FIG. 6C　　　　　　　　FIG. 6D

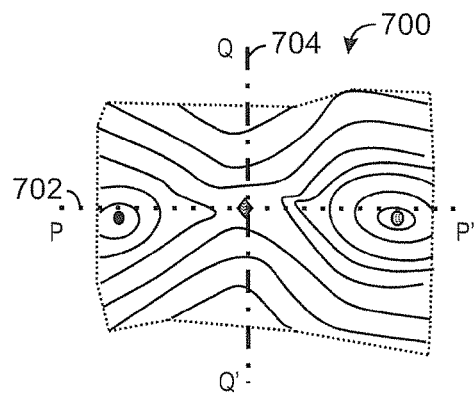
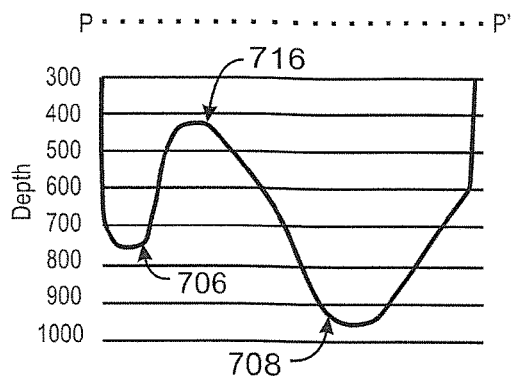
FIG. 7A    FIG. 7B
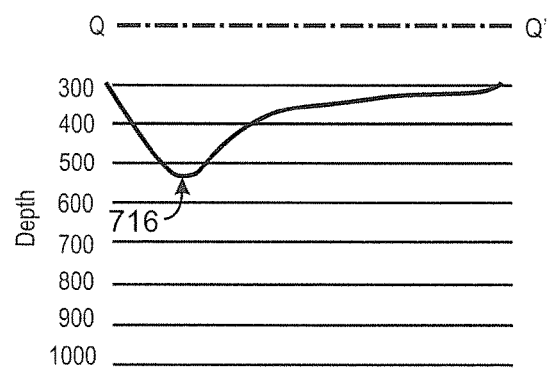
FIG. 7C
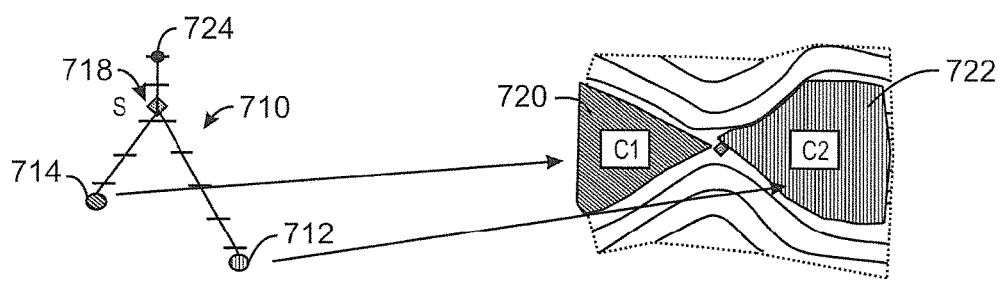
FIG. 7D    FIG. 7E

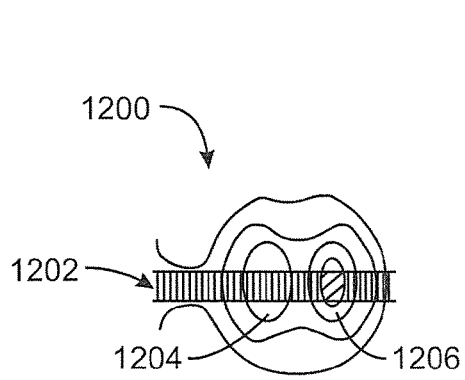
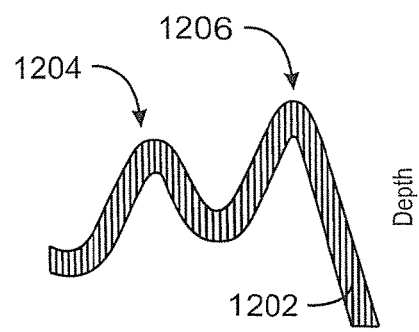
FIG. 12A                FIG. 12B
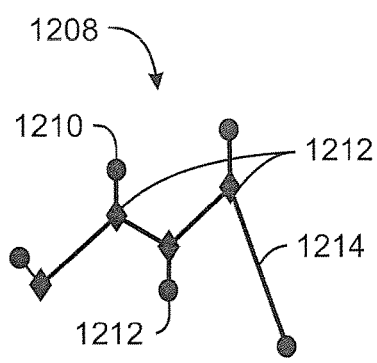
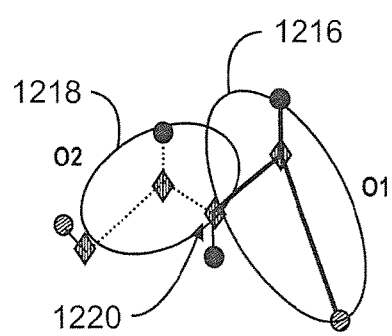
FIG. 12C                FIG. 12D
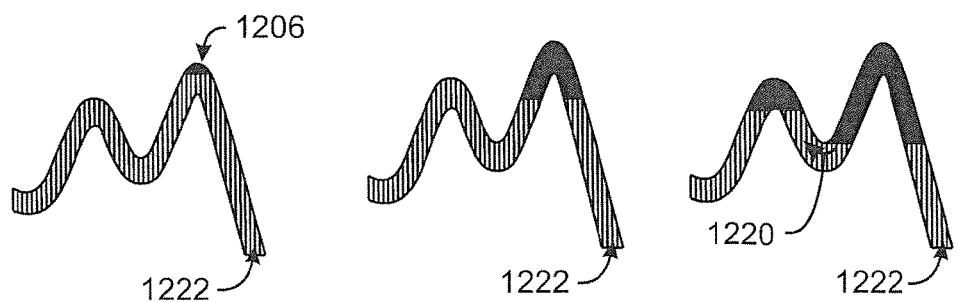
FIG. 12E          FIG. 12F          FIG. 12G

METHOD OF RESERVOIR COMPARTMENT ANALYSIS USING TOPOLOGICAL STRUCTURE IN 3D EARTH MODEL

CROSS-REFERENCE TO RELATED APPLICATION

This application is the National Stage entry under 35 U.S.C. 371 of PCT/US2011/063359 that published as WO 2012/102784 and was filed on 06 Dec. 2011, which claims the benefit of U. S. Provisional Application No. 61/436,462, filed on 26 Jan. 2011, each of which is incorporated by reference, in its entirety, for all purposes.

FIELD OF THE INVENTION

The present techniques relate to providing an analysis of data corresponding to a subsurface region. In particular, an exemplary embodiment of the present techniques relates to identifying compartments and their relationships in a reservoir based on topological structure.

BACKGROUND

This section is intended to introduce various aspects of the art, which may be associated with embodiments of the disclosed techniques. This discussion is believed to assist in providing a framework to facilitate a better understanding of particular aspects of the disclosed techniques. Accordingly, it should be understood that this section is to be read in this light, and not necessarily as admissions of prior art.

Three-dimensional (3D) model construction and visualization commonly employs data stored in a data volume organized as a structured grid or an unstructured grid. Data stored in a data volume may comprise a data model that corresponds to one or more physical properties about a corresponding region that may be of interest. Physical property model construction and data visualization have been widely accepted by numerous disciplines as a mechanism for analyzing, communicating, and comprehending complex 3D relationships. Examples of physical regions that can be subjected to 3D analysis include the earth's subsurface, facility designs and the human body.

In the field of hydrocarbon exploration, analysis of a reservoir's connectivity facilitates characterizing the reservoir. Moreover, connectivity analysis may affect decisions made in all phases of hydrocarbon resource development (such as exploration and production) of an asset's life cycle. Connectivity assessments can affect decisions ranging from determining optimal well locations, to managing reservoir decisions.

In one known technique, a set of rules and processes allow geologists to identify compartments from reservoir geometry. Typically, compartment identification starts with structure maps. Structural features, stratigraphic features, and the limits of top-seal or base-seal define compartment boundaries. Without knowledge of fluid contacts, depths, pressures conditions, one can identify potential compartment boundaries from the maps based on a few simple rules of the structural and stratigraphic features. That is, one can evaluate relevance of compartment boundaries defined by top-seal or base-seal. Traditional spill points on convex-upward closures and down-dip tips of faults or other structural or stratigraphic barriers are only relevant on top-of-reservoir maps. Break-over points, including those associated with concave-upward closures and up-dip tips of faults or other structural or stratigraphic barrier, are only relevant on base-of-reservoir maps. Even though the rules to identify compartments on the structure maps are relatively simple, the process of identification typically relies on the geologists' manual identification of compartment boundaries and contact relations among boundaries based on the contour and/or cross sessions display in structural surface.

FIG. 1 is a diagram that is useful in explaining the identification of compartments using structure maps. The diagram is generally referred to by the reference number 100. The diagram 100 includes a left panel 102, a center panel 104, and a right panel 106.

The left panel 102 shows a top-seal map of the top of a reservoir. The structural contour of the top seal is represented with isolines 108, each of which represents a solid polygon of uniform depth along the top of the reservoir.

The center panel 104 shows a base-seal map of the base of the reservoir. As in the left panel, the structural contour of the bottom seal is represented with isolines 108, each of which represents a solid polygon of uniform depth along the top of the reservoir.

The right panel 106 shows a cross section taken along lines A-A' 112 of the left panel 102 and the center panel 104. The depth contour of the top seal is shown as line 114, and the depth contour of the bottom seal is shown as line 116. The locations of the first compartment 118 and the second compartment 120 are clearly shown in the right panel 106. The dashed line in the right panel 106 shows the depth that is identified as the top of the first compartment 118. Thus, the potential compartments 118 and 120 can be manually identified by inspection of the reservoir contours of a base seal and a top seal.

Known processes of compartment identification rely on geologists' knowledge and step-by-step procedures to identify compartment boundaries first. The contacts from compartment boundaries may then be used to identify the spill points and break-over points among compartments. Furthermore, the traditional methods would make the handling of the uncertainty of the structural and stratigraphic features difficult if not impossible.

The following paragraphs provide specific examples of known techniques for processing geometric data. U.S. Pat. No. 5,966,141 to Ito, et al., discloses an animation solid that is created by an animation solid generator such that the shape of its cross section at t=t0 coincides with the shape of the contour of an object contained in a frame to be displayed at t=t0, wherein time t is set in the height z direction of the solid. For creation of this solid, topological considerations, including connected components and the tree structure of contours, are used. By chopping this solid, it is submitted that intermediate dividing can be performed. According to the disclosure, the basis of the topological geometry rests on Morse theory.

U.S. Pat. No. 6,323,863 to Shinagawa, et al., discloses that shape expressions in CAD or CG have often been carried out in polygon data. In polygon representations, the amount of data becomes very large if precision is pursued. Another shape representation utilizing the existing polygon data asset is disclosed. Polygon data showing the shape of an object is first obtained. Topological information of the object is extracted from the polygon data. Based on the information, the polygon data is converted into topological data. The inversion is carried out upon necessity.

U.S. Patent Application Publication No. 2005/0002571 by Hiraga, et al., discloses a shape analyzer that inputs a 3D representation of an object such as merchandise. A structural graph of the object is constructed by defining a continuous function on the surface of the object. The surface is then partitioned into plural areas according to the function values at the points on the surface. The areas are associated with nodes of the graph. By choosing a function that returns values invariant to rotation of the objects, the constructed graph also becomes invariant to rotation. This property is said to be important when searching for objects by shape from a shape database, as the postures of the objects are unknown when searching is performed. The analyzer is stated to be applicable to search engines for online shopping, where a user seeks goods by designating the general shape of the target.

S. Smale, "Morse Inequalities for a Dynamical System", Bulletin of American Mathematical Society, Volume 66, No. 1 (1960), describes a topological structure of a scalar field in the continuum. According to the article, a real value function $f: M$(a two-manifold)$\rightarrow R$ (a Real field) is called a Morse function if it is at least twice differentiable, its values at critical points (for example, minimums, maximums, saddles) defined by $\nabla f=0$ are distinct and its Hessian matrix of second derivatives of $f$ has nonzero determinant at critical points. Moreover, the article provides a topological analysis of mathematical theory that may be useful.

The following paragraphs provide specific examples of known reservoir data analysis techniques. U.S. Patent Application Publication No. 2006/0235666 by Assa, et al, discloses methods and systems for processing data used for hydrocarbon extraction from the earth. Symmetry transformation groups are identified from sampled earth structure data. A set of critical points is identified from the sampled data. Using the symmetry groups and the critical points, a plurality of subdivisions of shapes is generated, which together represent the original earth structures. The symmetry groups correspond to a plurality of shape families, each of which includes a set of predicted critical points. The subdivisions are preferably generated such that a shape family is selected according to a best fit between the critical points from the sampled data and the predicted critical points of the selected shape family.

International Patent Application Publication No. WO2009/094064 by Meurer, et al., discloses methods, computer-readable mediums, and systems that analyze hydrocarbon production data from a subsurface region to determine geologic time scale reservoir connectivity and production time scale reservoir connectivity for the subsurface region. Compartments, fluid properties, and fluid distribution are interpreted to determine geologic time scale reservoir connectivity and production time scale reservoir connectivity for the subsurface region. A reservoir connectivity model based on the geologic time scale and production time scale reservoir connectivity for the subsurface region is constructed, wherein the reservoir connectivity model includes a plurality of production scenarios each including reservoir compartments, connections, and connection properties for each scenario. Each of the production scenarios is tested and refined based on production data for the subsurface region.

P. J. Vrolijk, et al., "Reservoir Connectivity Analysis—Defining Reservoir Connections and Plumbing", SPE Middle East Oil and Gas Show and Conference, Kingdom of Bahrain (2005), provides that gas, oil, and water fluids in channelized or faulted reservoirs can create complex reservoir plumbing relationships. Variable hydrocarbon contacts can develop when some, but not all, fluids are in pressure communication. Reservoir Connectivity Analysis (RCA) is a series of analyses and approaches to integrate structural, stratigraphic, and fluid pressure and composition data into permissible but non-unique scenarios of fluid contacts and pressures. RCA provides the basis for fluid contact and pressure scenarios at all business stages, allowing the creation of fluid contact and segmentation scenarios earlier in an exploration or development setting, and the identification of by-passed pays or new exploration opportunities in a production setting. Combining conventional structural and fault juxtaposition spill concepts with a renewed appreciation of fluid break-over (contacts controlled by spill of pressure-driven, denser fluid, like water over a dam) and capillary leak (to define the ratio of gas and oil where capillary gas leak determines the gas-oil contact (GOC)), permissible but non-unique scenarios of the full fluid fill/displacement/spill pathways of a hydrocarbon accumulation are defined comprising single or multiple reservoir intervals.

Y. Gingold, et al., "Controlled-Topology Filtering", Computer-Aided Design, Volume 39, Issue 8 (2007) presents an algorithm based on Critical Point analysis that postulates that the filtering result would preserve the topological features on the surface. According to the paper, many applications require the extraction of isolines and isosurfaces from scalar functions defined on regular grids. These scalar functions may have many different origins, from MRI and CT scan data to terrain data or results of a simulation. As a result of noise and other artifacts, curves and surfaces obtained by standard extraction algorithms often suffer from topological irregularities and geometric noise. While it is possible to remove topological and geometric noise as a post-processing step, in the case when a large number of isolines are of interest there is a considerable advantage in filtering the scalar function directly. While most smoothing filters result in gradual simplification of the topological structure of contours, new topological features typically emerge and disappear during the smoothing process. The paper describes an algorithm for filtering functions defined on regular 2D grids with controlled topology changes, which is stated to ensure that the topological structure of the set of contour lines of the function is progressively simplified.

P. Bremer, et al., "Maximizing Adaptivity in Hierarchical Topological Models Using Extrema Trees", IEEE PROC-216200 (2005), discloses an adaptive hierarchical representation of the topology of functions defined over two-manifold domains. Guided by the theory of Morse-Smale complexes, dependencies between cancellations of critical points are encoded using two independent structures: a traditional mesh hierarchy to store connectivity information and a new structure called an extrema tree to encode the configuration of critical points. Extrema trees are described as providing a powerful method to increase adaptivity while using a relatively simple data structure. The resulting hierarchy is described as being relatively flexible. In particular, the resulting hierarchy is stated to be guaranteed to be of logarithmic height.

A. Gyulassy, et al., "A Topological Approach to Simplification of Three-dimensional Scalar Functions", IEEE Transactions Visualization and Computer Graphics (2006), describes a combinatorial method for simplification of topological features in a 3D scalar function. The Morse-Smale complex, which provides a succinct representation of a function's associated gradient flow field, is used to identify topological features and their significance. The simplification process, guided by the Morse-Smale complex, proceeds by repeatedly applying two atomic operations that each remove a pair of critical points from the complex. Efficient storage of the complex results in execution of these atomic operations at interactive rates. Visualization of the simplified complex shows that the simplification preserves significant topological features while removing small features and noise.

G. H. Weber, et al., "Topology-controlled Volume Rendering", IEEE Transactions Visualization and Computer Graphics (2007), discloses that topology provides a foundation for the development of mathematically sound tools for processing and exploration of scalar fields. Existing topology-based methods can be used to identify interesting features in volumetric data sets, to find seed sets for accelerated isosurface extraction, or to treat individual connected components as distinct entities for isosurfacing or interval volume rendering. A framework for direct volume rendering based on segmenting a volume into regions of equivalent contour topology is described, applying separate transfer functions to each region. Each region corresponds to a branch of a hierarchical contour tree decomposition, and a separate transfer function can be defined for it. A volume rendering framework and interface where a unique transfer function can be assigned to each subvolume corresponding to a branch of the contour tree. Also disclosed is a runtime method for adjusting data values to reflect contour tree simplifications. Purported to be disclosed is an efficient way of mapping a spatial location into the contour tree to determine the applicable transfer function. Also stated to be disclosed is an algorithm for hardware accelerated direct volume rendering that visualizes the contour tree-based segmentation at interactive frame rates using graphics processing units (GPUs) that support loops and conditional branches in fragment programs.

H. Carr, "Contour Tree Simplification With Local Geometric Measures", MIT, 14th Annual Fall Workshop on Computational Geometry (2004), discloses that the contour tree, an abstraction of a scalar field that encodes the nesting relationships of isosurfaces, has several potential applications in scientific and medical visualization, but noise in experimentally-acquired data results in unmanageably large trees. Geometric properties of the contours are attached to the branches of the tree and simplification by persistence is applied to reduce the size of contour trees while preserving features of the scalar field.

SUMMARY

Embodiments of the present disclosure provide techniques for automatically identifying potential compartments of a reservoir based on the reservoirs geological structure. An exemplary embodiment provides a method of identifying compartments of a reservoir structure. The method includes obtaining structural data corresponding to a geological structure of a reservoir. The method also includes generating a topological net based on the structural data, the topological net comprising critical points and poly segments connecting the critical points. The method also includes identifying potential compartments of the reservoir structure based on the topological net. The method also includes identifying spill or break-over relationships among the potential compartments based on the topological net.

In an embodiment, the critical points include a minimum critical point, a maximum critical point, a top saddle critical point, or a base saddle critical point. The top saddle critical point may be identified as a spill relation between the potential compartments corresponding to the top saddle critical point. The base saddle critical point may be identified as a break-over relation between the potential compartments corresponding to the base saddle critical point. In an embodiment, the poly segments correspond to reservoir regions of the reservoir structure. If the critical points include a top saddle critical point and a maximum critical point, the reservoir region corresponding to the poly segment connecting by the critical points may be identified as one of the potential compartments. Further, if the critical points comprise a base saddle critical point and a minimum critical point, the reservoir region corresponding to the poly segment connecting the critical points may identified as one of the potential compartments.

In an embodiment, a point in one of the poly segments corresponds to a level set contour of the reservoir structure. Points on the poly segments may represent structural contours, which are generated by obtaining depth level sets of the structural data from a real value function that maps to depths ranging from minimum depth to maximum depth of the structural data. In an embodiment, the method may include identifying critical points of the topological net by passing a plane of constant depth through the reservoir structure to obtain depth level contours and identifying locations where the depth level contours intersect. Furthermore, the structural data may comprise geological surfaces, seismic data, geological models, reservoir models, or some combination thereof. The method may also include adding the potential compartments to a reservoir connectivity diagram. The method may also include adding the spill or break-over relationships to the reservoir connectivity diagram.

Another embodiment provides a method of performing a reservoir connectivity analysis. The method includes obtaining structural data corresponding to a geological structure of a reservoir. The method also includes generating a topological net based on the structural data, the topological net comprising critical points and poly segments connecting the critical points. The method also includes identifying a potential compartment of the reservoir based on the critical points and adding the potential compartment to a reservoir connectivity diagram. The method also includes comparing measured pressure data with expected pressure data, wherein the expected pressure data is generated based on the reservoir connectivity diagram. In an embodiment, the method also includes, modifying the topological net if the measured pressure data is inconsistent with the expected pressure data and generating a modified reservoir connectivity diagram based on the modified topological net.

Another embodiment provides a system for analyzing reservoir structure data. The system includes a processor and a non-transitory, computer-readable medium comprising code configured to direct operations of the processor. The code is configured to direct the processor to obtain structural data corresponding to a geological structure of a reservoir. The code is also configured to direct the processor generate a topological net based on the structural data, the topological net comprising critical points and poly segments connecting the critical points. The code is also configured to direct the processor to identify potential compartments of the reservoir based on the topological net.

In an embodiment, the code configured to direct the processor to identify potential compartments identifies one of the poly segments between two or more of the critical points as one of the potential compartments. The non-transitory, computer-readable medium can also include code configured to direct the processor to identify one of the critical points as a spill or break-over connection between the potential compartments corresponding to the poly segments connected by the critical point. The non-transitory, computer-readable medium can also include code configured to direct the processor to generate the poly segment by obtaining depth level sets of the structural data from a real value function that maps to depths ranging from minimum depth to maximum depth of the structural data. In an embodiment, the system includes a visualization engine configured to provide a visual display of a reservoir and overlay the topological net over the visual display of the reservoir. The non-transitory, computer-readable medium can also include code configured to direct the processor to add the potential compartments and relationships between compartments to a reservoir connectivity diagram.

Another embodiment provides a non-transitory, computer readable medium that includes code configured to direct operations of processor. The code is configured to direct the processor to obtain structural data corresponding to a structure of a reservoir and generate a topological net based on the structural data, the topological net including critical points and poly segments connecting the critical points. The code is also configured to direct the processor to identify potential compartments of the reservoir based on the topological net. The code is also configured to direct the processor to identify spill or break-over relationships among the potential compartments based on the topological net.

In an embodiment, the critical points comprise a minimum critical point, a maximum critical point, a top saddle critical point, or a base saddle critical point and the poly segments correspond to regions of the reservoir. If the critical points include a base saddle critical point and a minimum critical point, a reservoir region corresponding to the poly segment connecting the critical points may be identified as one of the potential compartments. Points on the poly segments may represent structural contours, which are generated by obtaining depth level sets of the structural data from a real value function that maps to depths ranging from minimum depth to maximum depth of the structural data.

BRIEF DESCRIPTION OF THE DRAWINGS

Advantages of the present techniques may become apparent upon reviewing the following detailed description and drawings of non-limiting examples of embodiments in which:

FIGS. 6A-D are diagrams showing reservoir regions that may be selected for generating a topological net according to exemplary embodiments of the present techniques;

FIGS. 7A-E are diagrams useful for describing a method of generating a topological net according to exemplary embodiments of the present techniques;

FIGS. 12A-G are diagrams that show an example of using a topological net to conduct reservoir connectivity analysis according to exemplary embodiments of the present techniques.

DETAILED DESCRIPTION

Figure 1:
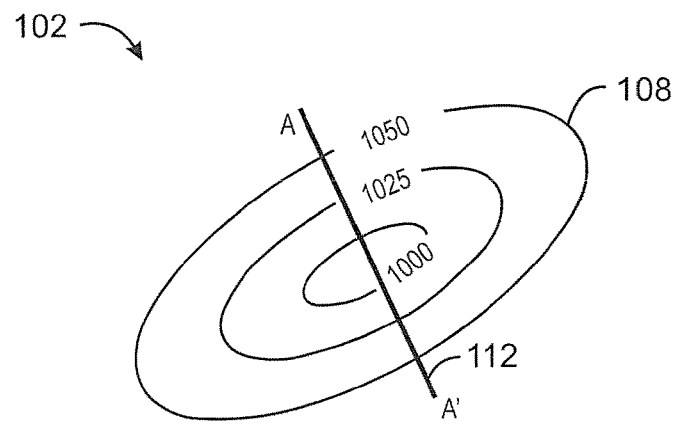
FIG. 1 is a diagram that is useful in explaining the identification of compartments using structure maps.
Figure 1:
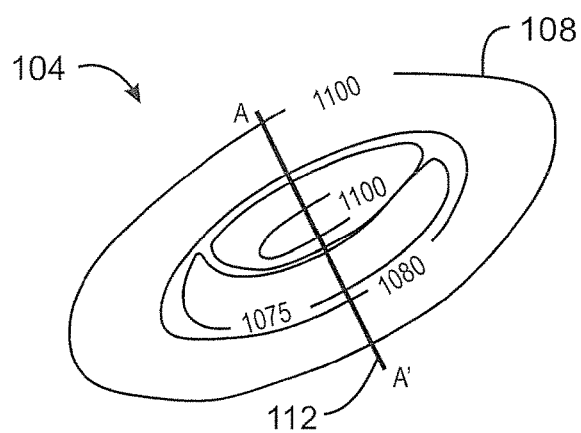
Figure 1:
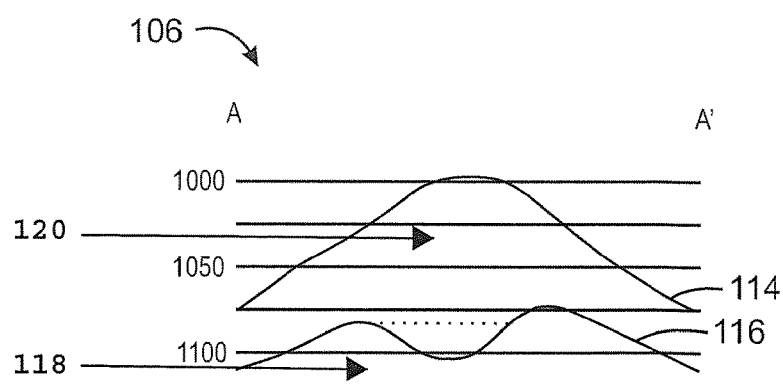

In the following detailed description section, specific embodiments are described in connection with preferred embodiments. However, to the extent that the following description is specific to a particular embodiment or a particular use, this is intended to be for exemplary purposes only and simply provides a description of the exemplary embodiments. Accordingly, the present techniques are not limited to embodiments described herein, but rather, it includes all alternatives, modifications, and equivalents falling within the spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent.

As used herein, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. One or more computer components can reside within a process and/or thread of execution and a computer component can be localized on one computer and/or distributed between two or more computers.

As used herein, the terms "non-transitory, computer-readable medium", "tangible machine-readable medium" or the like refer to any tangible storage that participates in providing instructions to a processor for execution. Such a medium may take many forms, including but not limited to, non-volatile media, and volatile media. Non-volatile media includes, for example, NVRAM, or magnetic or optical disks. Volatile media includes dynamic memory, such as main memory. Computer-readable media may include, for example, a floppy disk, a flexible disk, hard disk, magnetic tape, or any other magnetic medium, magneto-optical medium, a CD-ROM, any other optical medium, a RAM, a PROM, and EPROM, a FLASH-EPROM, a solid state medium like a holographic memory, a memory card, or any other memory chip or cartridge, or any other physical medium from which a computer can read. When the computer-readable media is configured as a database, it is to be understood that the database may be any type of database, such as relational, hierarchical, object-oriented, and/or the like. Accordingly, exemplary embodiments of the present techniques may be considered to include a tangible storage medium or tangible distribution medium and prior artrecognized equivalents and successor media, in which the software implementations embodying the present techniques are stored.

As used herein, the term "earth model" refers to a geometrical model of a portion of the earth that may also contain material properties. The model is shared in the sense that it integrates the work of several specialists involved in the model's development (non-limiting examples may include such disciplines as geologists, geophysicists, petrophysicists, well log analysts, drilling engineers and reservoir engineers) who interact with the model through one or more application programs.

As used herein, the term "primitive" refers to a basic geometric shape. Examples of 2D primitives include rectangles, circles, ellipses, polygons, points, lines or the like. Examples of 3D primitives include 3D representations of 2D primitives such as three dimensional polygons, line segments. Other 3D primitives include cubes, spheres, ellipsoids, cones, cylinders or the like.

As used herein, the term "property" refers to data representative of a characteristic associated with different topological elements on a per element basis. Generally, a property could be any computing value type, including integer and floating point number types or the like. Moreover, a property may comprise vectors of value types. Properties may only be valid for a subset of a geometry object's elements. Properties may be used to color an object's geometry. The term "property" may also refer to a characteristic or stored information related to an object.

As used herein, the term "poly segment" refers to an ordering of points. A poly segment may or may not be closed and may be represented as one or more connected line segments connecting adjacent points. A line segment can be split into two or more line segments by adding additional points. Points and line segments of a poly segment may have properties. Properties, such as pressure gradient value and depth value, may be used in the interpretation processes and/or to control the presentation/visualization of the poly segment, such as specifying a color or line thickness, for example. Property values may be discrete or interpolated between known points.

As used herein, the term "cell" refers to a collection of faces, or a collection of nodes that implicitly define faces, where the faces together form a closed volume.

As used herein, the term "seismic data" refers to a multi-dimensional matrix or grid containing information about points in the subsurface structure of a field, where the information was obtained using seismic methods. Seismic data typically is represented using a structured grid. Seismic attributes or properties are cell- or voxel-based.

As used herein, the terms "visualization engine" or "VE" refer to a computer component that is adapted to present a model and/or visualization of data that represents one or more physical objects.

As used herein, the term "well" refers to a surface location with a collection of wellbores. Wells may be visually rendered as a point or a glyph, along with a name.

As used herein, the term "wellbore" refers to a constituent underground path of a well and associated collections of path dependent data. A wellbore may be visually rendered as a collection of connected line segments or curves. Wellbores may also be visually rendered cylindrically with a radius.

As used herein, the term "seal" refers to impermeable rocks that keep hydrocarbons in place and prevent them from escaping to the surface, for example shale.

As used herein, the terms "compartment" or "reservoir compartment" refer to a trap containing no identified barriers that would allow the contact between two fluids to reach equilibrium at more than one depth.

As used herein, the term "break-over" refers to a loss of a denser fluid driven by overpressure at a break or saddle in the base-seal.

As used herein, the term "spill" refers to an escape of the more buoyant fluid at a break or cusp in the top-seal.

Some portions of the detailed description which follows are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. These quantities may be stored, transferred, combined, compared, and otherwise manipulated in a computer system.

An exemplary embodiment of the present techniques relates to a process of modeling the dynamic nature of compartments in a subsurface region. Embodiments of the present techniques use numerical and/or geometrical algorithms to create a topological network from the reservoir geometry based on a real value function, $f_R$, that describes the geometric structure of the reservoir region. By abstracting the geometrical complexity of the reservoir to a topological net, the relations among compartments can better be understood and the process of compartment identification can be accelerated.

One exemplary embodiment employs topology of the 3D reservoir constructs to identify compartments. An exemplary embodiment may facilitate the creation of 3D geometry structures of potential compartments and their topological relationships. A framework may be provided for reservoir connectivity analysis in all phases of the reservoir management.

Exemplary embodiments relate to a method to utilize topological structure which provides compartment identification and spill/break-over analysis in a given reservoir. The exemplary method would use geological surfaces and/or volume data structures to construct geometry/containment of reservoir compartments and/or to create spill/break-over relations among compartments. The identification of reservoir compartments can utilize topological analysis from the surface/volume data for the initial data abstraction and the relationship among the reservoir compartments can then be determined The present techniques may be used in conducting reservoir connectivity analysis (RCA) based on the static reservoir geometry. A method according to the present techniques may also be used in an interactive environment in which user can utilize the constructed framework to conduct dynamic reservoir connectivity analysis (DCA), wherein the production of the reservoir would affect the spill/break-over relationships.

Figure 2:
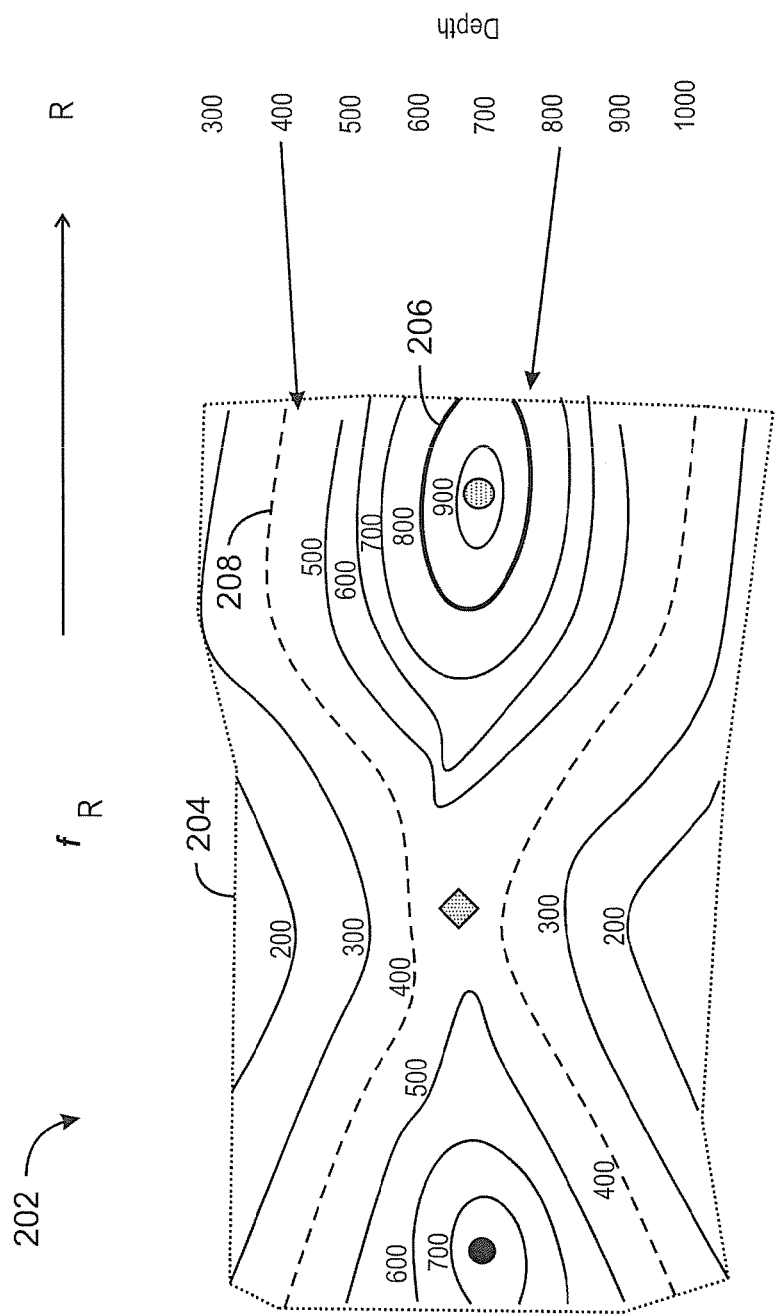
FIG. 2 is a diagram that shows a mapping of reservoir data using a real value function according to exemplary embodiments of the present techniques.

Prior to performing connectivity analysis, compartments in the reservoir of interest are identified. Identification of reservoir compartments typically requires analysis of reservoir geometry. Compartments are essentially traps containing no identified barriers that would allow the contact between two fluids to reach equilibrium at more than one depth. The communications among the compartments are controlled not only by the shape of the reservoir geometry, but also by the spill locations and break-over locations. Thus, the topology of the reservoir geometry and the topological relationships among identified regions are the most common control for the compartment identifications. Exemplary embodiments of the present invention provide computerized techniques for automatically identifying potential reservoir compartments and characterizing the fluid communication between compartments. FIG. 2 is useful in explaining a process of identifying compartments in accordance with the present techniques.

FIG. 2 is a diagram that shows a mapping of reservoir data using a real value function according to exemplary embodiments of the present techniques. The diagram is generally referred to by the reference number 200 and represents a top seal or base seal surface of a reservoir. As shown in the diagram 200, a reservoir data structure 202 may be mapped by a real value function, $f_R$, with depth as the domain of the function and a range corresponding to the depth of the reservoir data structure. In embodiments, the real value function, $f_R$, is a Morse function. FIG. 2 also shows a reservoir boundary 204, which represents the boundary of the area of interest around a portion of the geological structure, which has been selected for compartment identifications.

According to the present techniques, the topological relationship of the reservoir is extracted from the reservoir geometry. More specifically, the disclosed method uses a depth function as a real value function, $f_R$, that maps the reservoir data structure 202 as the domain of the function to the depth range of the reservoirs. Based on this functional definition, the inverse image, or pre-image, of a constant value, $f_R^{-1}(Z)$, while z is in depth, is a corresponding depth level set in the domain of function $f_R$. The depth level set can be determined by identifying all the locations on the reservoir data structure that have the same depth value. A sequence of depth level sets ranging from depth 300 to 1000 is shown as a series of surface contours in the diagram 200 of FIG. 2. That is, the pre-image of a specific depth value is a corresponding set of surface contour polygons. For example, a pre-image of $f_R^{-1}(800)$ is shown as a solid line 206 and a pre-image of $f_R^{-1}(400)$ is shown as a dashed line 208.

Figure 3:
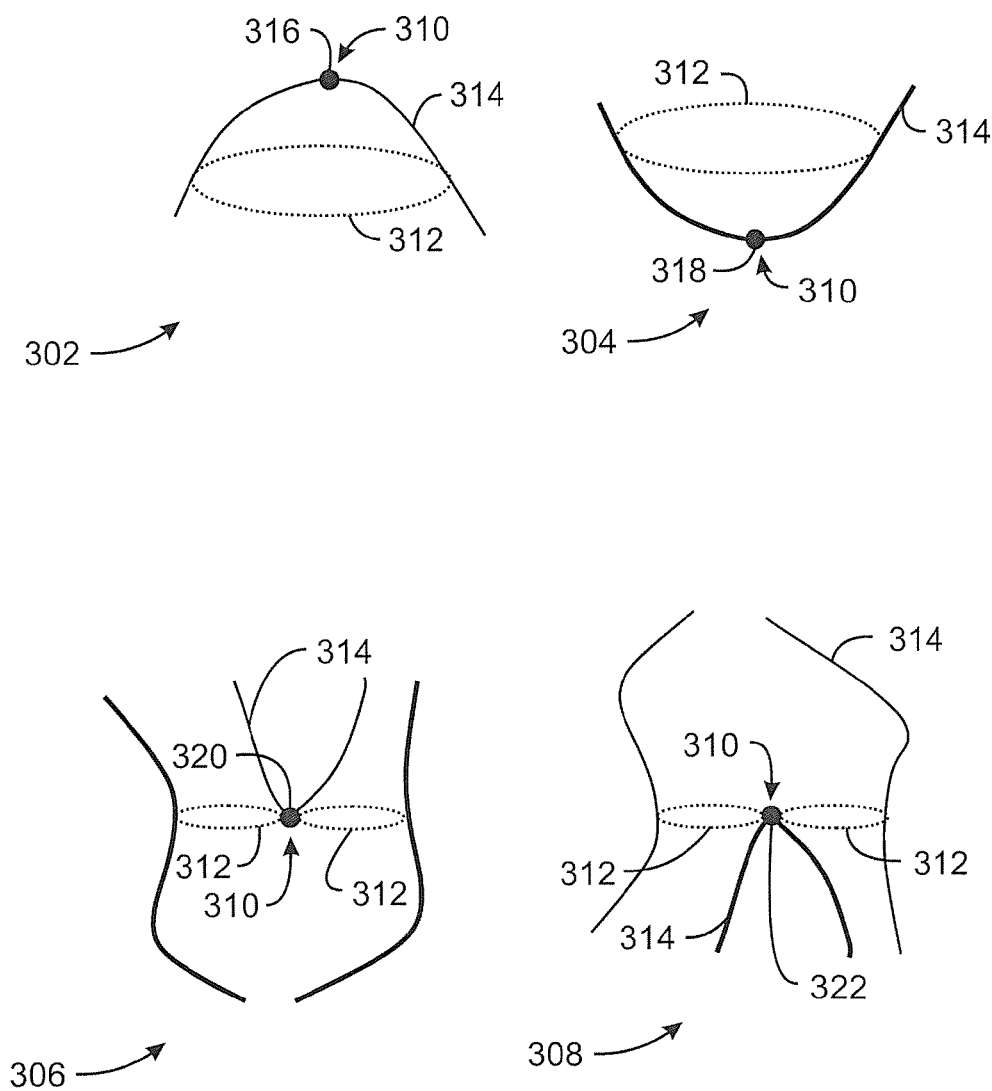
FIG. 3 is a set of diagrams that explains various topological features of compartments in a reservoir.

FIG. 3 is a set of diagrams that explain various topological features of compartments in a reservoir. The cross sectional surface 314 of the geological structures are represented as solid lines. The bold solid lines represents the base seal surfaces and the thin solid lines represents the top seal surfaces. The set of diagrams includes a maximum topology panel 302, a minimum topology panel 304, a top saddle topology panel 306 and a base saddle topology panel 308. In all of the topology panels shown in FIG. 3, critical points 310 are shown as solid black dots and a depth contours 312 is shown as dotted line.

The maximum topology panel 302 shows a surface contour 314 of a top surface that forms an anticline. In the maximum topology panel 302 a maximum point 316 (critical point) is shown as a solid black dot disposed at the top of the surface contour 314. The minimum topology panel 304 shows a surface contour 314 of a base surface that forms a syncline. In the minimum topology panel 304 a minimum point 318 (critical point) is shown as a solid black dot disposed on the bottom of the surface contour 314. The top saddle topology panel 306 shows a surface contour 314 of a top saddle. A top saddle point 320 (critical point) is shown as a solid black dot. A surface may be referred to as a "saddle point" if the surface curves upward in one direction and curves downward in a different direction. For example, the surface contour 314 curves upward from the top saddle point 320 as shown in the top saddle topology panel 306 but also curves downward in another direction, for example, out of the page. The base saddle topology panel 308 shows a surface contour 314 of a base saddle. A base saddle point 322 (critical point) is shown as a solid black dot.

In accordance with an exemplary embodiment of the present techniques, a topological structure of a reservoir may be analysed by identifying critical points from their bounding horizons, which may be represented by top-seal surfaces, bottom seal surfaces, and/or volumetric data structures. Topological relationships may be established between the critical points during the process of identifying them. The established topological relationships may then map to the original bounding horizons and/or volumetric structure of the given reservoirs. The identification of critical points is described further, in relation to FIG. 5. The significance of identifying critical points is illustrated in FIGS. 4A and 4B.

Figure 4A:
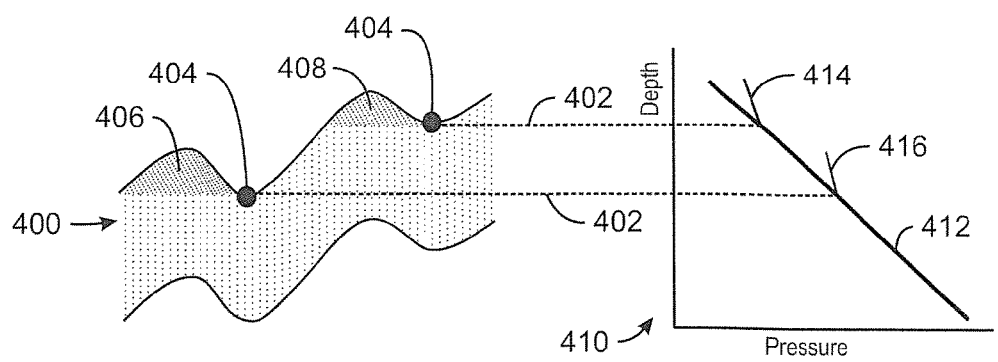
FIG. 4A is a diagram showing a cross-section view of a single water column with two gas/water contacts.

FIG. 4A is a diagram showing a cross-section view of a single water column 400 with two gas/water contacts. Two critical points 404, shown as dots, are identified as spill points for the gas accumulation in two compartments 406 and 408. The compartments 406 and 408 are locations in which a relatively light fluid such as gas may be trapped by a heavier fluid such as water. The spill points indicate the depth above which each compartment 406 and 408 is located. Also shown in FIG. 4A is a depth/pressure profile 410 of the water column 400 and the two compartments 406 and 408. The depth/pressure profile includes a water pressure gradient represented by line 412, a gas pressure gradient of compartment 408 is represented by line 414, and a gas pressure gradient of compartment 406 is represented by line 416. The depth/pressure profile shows equilibrium on certain depths where the water/gas pressure reaches to steady states in the current setting. Any excess gas that enters the left compartment 406 would spill over at the critical point 404 to the right compartment 408.

Figure 4B:
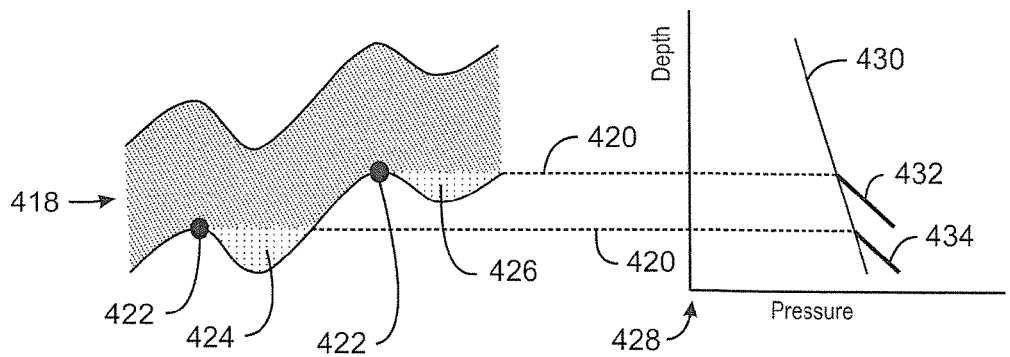
FIG. 4B is a diagram showing a cross-section view of a single gas column with two gas/water contacts.

FIG. 4B is a diagram showing a cross-section view of a single gas column 418 with two gas/water contacts 420. Two critical points 422, shown as dots, are identified as breakover points for the accumulation of water in two compartments 424 and 426. The compartments 424 and 426 are locations in which a relatively heavy fluid, such as water, may be trapped by a lighter fluid such as gas. The spill points indicate the depth above which each compartment 406 and 408 is located. Also shown in FIG. 4B is a depth/pressure profile 428 of the water column 418 and the two compartments 424 and 426. The depth/pressure profile includes a gas pressure gradient represented by line 430, a water pressure gradient of compartment 426 represented by line 432, and a water pressure gradient of compartment 424 represented by line 434. Any excess water that enters the right compartment 426 would spill over at the critical point 422 to the left compartment 424.

Figure 5:
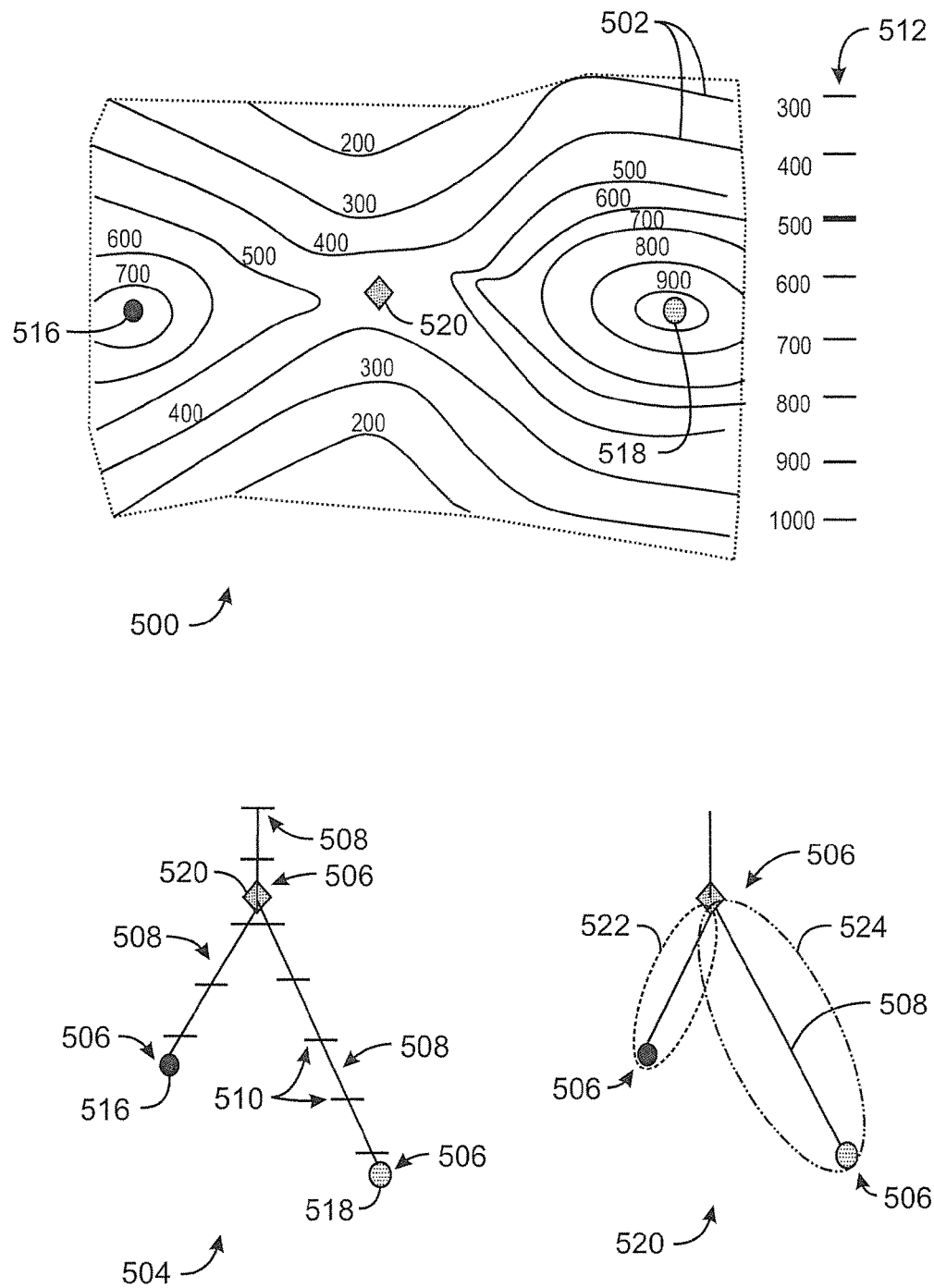
FIG. 5 is a diagram of a reservoir structure and a corresponding topological net according to exemplary embodiments of the present techniques.

FIG. 5 is a diagram of a reservoir structure and a corresponding topological net according to exemplary embodiments of the present techniques.

A topological net is a data representation for relationships of reservoir compartments, similar in structure to a Reeb Graph, where each node is an abstraction of a level set contact on a given reservoir. An edge connecting nodes indicates a smooth transition between two level sets. Each edge can also contain attributes such as gas/oil/water pressure gradients within each reservoir regions. A first panel 500 shows the reservoir structure of a base horizon with depth contours 502 in 100 foot increments. A second panel 504 shows the topological net corresponding to the reservoir structure of the first panel 500. As shown in FIG. 5, the topological net can be represented as a graph with critical points 506 and poly segments 508 that connect the critical points 506. Each critical point 506 in the topological net represents a minimum, maximum, or saddle point on the reservoir geometry.

Various types of geometrical information about the original reservoir geometry may be captured in the topological net 504, such as the depth and location of the critical points 506. For example, each poly segment 508 can include markers 510 corresponding with a depth indicator 512, thus enabling the approximate depth of critical points to be ascertained. By way of example, the topological net 504 shown in FIG. 5 includes a minimum critical point 516 at a depth of between 700 and 800 feet, a minimum critical point 518 at a depth of between 900 and 1000 feet, and a saddle point at a depth of between 400 and 500 feet. All three critical points 516, 518, and 520 are also shown in the reservoir structure panel 500. Depth contours are shown as horizontal line segments on the topological net 504.

Further, the relative spatial arrangement of the critical points 506 can be displayed in the topological net. For example, the horizontal distance between the minimum critical points 516 and 518 as shown in the topological net 504 may be proportional to the actual horizontal distance between the minimum critical points 516 and 518 as indicated by the reservoir geometry. In embodiments, the horizontal distance between the critical points 516 and 518 shown in the topological net 504 may be unrelated to the actual horizontal distance between the points as indicated by the reservoir geometry.

In embodiments, the topological net 504 is obtained by representing the connected components of the depth level sets in the reservoir data structure as points. The reservoir structure can include a collection of point locations referred to as depth level sets. The real value function, $f_R$, is a mapping function that maps elements of the reservoir structure to a real value, depth. A depth level set is a set of points in the real value function, $f_R$, that have the same depth value. Connected components of a depth level set are those points in a given level set that are part of a single contour polygon, in other words, the pre-image of a given depth value under mapping function, $f_R$. The topological net 504 can be computed by applying an equivalence relation that identifies all locations in the reservoir that belong to the same pre-image as a single point characterized by the depth of the pre-image. Thus, if X and Y are locations in the reservoir such that $f_R(X)=f_R(Y)=D$ and X and Y are both components of $f_R^{-1}(D)$, then the locations X and Y correspond to a single point characterized by a depth, D. Accordingly, it can be seen that each contour line 502 shown in panel 500 can be abstracted to be represented as a single point characterized by the depth of the contour line 502. The spatial coordinates of the abstracted point can also be determined to indicate the locations of the level set in the reservoir. The spatial coordinates may be associated with each corresponding abstracted points and displayed in the topological net 504. Based on the relationship and graph structure of the topological net, in which two nodes are directly connected by a segment having parent-child relationship, the critical points may be identified. For example, a node with no parent node would be identified as maximum critical point. A node with no child node would be identified as minimum critical point. And a node with two branches of parent node or child nodes would be identified as saddle critical point.

Based on the topological net 504, various compartments can be readily identified systematically or by the user, as shown in a third panel 520 of FIG. 5. As stated in FIG. 3, four kinds of critical points could be identified; a minimum critical point, a maximum critical point, a top saddle critical point, and a base saddle critical point. A potential compartment is a geological trap that may be able to contain fluid such as gas, oil, and/or water. The locations of the geological traps depend on the density and pressure of the fluids. Since a base saddle critical point would allow the trapped oil/water break over from one trap to another trap, potential compartments can be identified by the reservoir regions separated by the base saddle location. In this example, two base seal compartments can be identified. They have the potential to trap the heavier fluids up to the location shown as 520, in which the trapped fluids would potentially break over. One method of identifying potential base trap compartments from a topological net is to locate the minimum critical points first; each poly segments leading from a minimum critical point to a base saddle critical point would represent a potential compartment. The same process can be done for top seal compartments by identifying maximum critical points and a poly segment that leads to a top saddle critical point. As shown in the third panel 520, the potential compartment 524 can be identified from its corresponding poly segment between the base saddle critical point 520 and minimum critical point 518. Accordingly, a first compartment 522 is identified from its corresponding poly segment between the base saddle critical point 520 and the minimum critical point 516. The break-over relationship among compartment 522 and 528 can also be established via the location of the critical point 520.

The generation of the topological net enables identifications of the potential compartments 522 without examining the geometrical data structure of the reservoir. Furthermore, by analyzing the topological relation of the critical points on the topological net, the compartments, fluid contacts and their spill/break-over relations can be tracked. The fluid contact movements would be reflected in the level sets contours on the reservoir geometry. For example, it can be seen that compartment 522 and 524 would have a break-over point at the location of the saddle critical point 520. The fluid contact depth for compartments 522 and 524 to fluid on the compartment 526 would be on the depth of saddle critical point 520 right before the break-over occurs.

In embodiments, a three-dimensional geological model of a reservoir is generated and one or more reservoir data structures may be selected for analysis and generation of a topological net 504. The selected reservoir data structures can include one or more geological objects, including stratigraphic units such as top seal surfaces, base seal surfaces, and the like. In some embodiments, the selected stratigraphic units can include fault surfaces, in which case the boundaries of compartments could also be determined by the structural features of one or more faults.

FIGS. 6A-D are diagrams showing reservoir structures that may be selected for generating a topological net according to exemplary embodiments of the present techniques. FIG. 6A shows an example of a top seal 600 that may be selected for analysis. As shown in FIG. 6A, a top surface of an anticline may be identifiable from a geological model. Thus, it may be determined that a compartment 602 may be sealed by the top surface.

FIG. 6B shows an example of a base seal 604 that may be selected for analysis. As shown in FIG. 6C, a bottom surface of a syncline may be identifiable from the geological model. Further, two potential compartments 606 and 608 controlled by a break-over point 610 may be identified.

FIG. 6C shows an example of geological structure that may be selected for analysis and includes a plurality of potential reservoir compartments separated by a fault. The reservoir cross-section of FIG. 6C displays the reservoir stratigraphy by top and base seal. A single reservoir interval is broken into two fault blocks 612 and 614 separated by a fault surface 616 shown as solid line. Without the fault, one top compartment could be formed by the top seal surface. Instead, two potential top compartments 618 and 620 and two potential bottom compartments 622 and 624 are identifiable. If the fault surface is leaky, the juxtaposition of the two reservoir blocks 612 and 614 could allow fluid communication across the fault 616. Water from compartment 622 could break-over to the compartment 624, while gas or oil could spill from compartment 618 to compartment 620.

FIG. 6D shows an example of a volumetric data structure that may be selected for analysis. As used herein, a "volumetric data structure" is any geological structure that can be represented as a closed container bounded by a top seal horizon, a base seal horizon, and/or fault surfaces. In this example, a top and base seal horizon surfaces is used to represent the reservoir. Within the top seal horizon and base seal horizon, other internal area of the reservoir could be excluded from the analysis by one or more internal surfaces 628.

Using the data structures of the selected reservoir geometry such as those described in FIGS. 6A-D, topological nets may be created. During the generation of the topological nets, the topological elements and their associated critical points may be extracted from the given reservoir geometry. The topological elements represent potential compartments, while the critical points represent potential spill-over and break-over locations. Techniques for extracting topological elements and their associated critical points may be better understood with reference to FIGS. 7A-D.

FIGS. 7A-E are diagrams useful for describing a method of generating a topological net according to exemplary embodiments of the present techniques. FIG. 7A shows a base-seal surface 700 for a given reservoir shown as a stratigraphic map. In this example, the base of the reservoir is at about 1000 feet below sea level and the top of the reservoir is at about 300 ft below sea level. Cross sectional views of the reservoirs corresponding to line 702 (P to P') and line 704 (Q to Q') are shown in FIGS. 7B and 7C respectively. The solid polygons shown in FIGS. 7B and 7C represent the base-seal of the reservoir structure shown in FIG. 7A. The cross section views shown on the FIGS. 7B and 7C are used to illustrate the complexity of the three dimensional aspect of the reservoir compartmentalization. This example also shows the advantages of the present techniques. Unlike current practices of compartment identifications, embodiments of the present techniques use the topological net, which would not be hindered by the selection of the cross section view for the purposes of compartment identifications. Furthermore, the simplification of complex geometrical reservoir internal and boundary structure to topological representations allows not only the identifications of potential compartments but also the spill/break-over relationship among compartments automatically.

In embodiments, the base-seal surface 700 is treated as smooth and differentiable in any given location except at the boundary of the selected geological structure. As generally described above, the topological net may be defined by the equivalence relation that identifies any location X and Y in the reservoir with depth D in which $D=f_R(X)=f_R(Y)$ if they belong to the same component of $f_R^{-1}(D)$. The conditions used to define a Morse function, $f_R$, may not be observed for locations that are non-differentiable. For example, a selected reservoir region may contain a flat surface in which a local minimum point may not be able to be determined In another case, a selected reservoir region may contain non-smoothed, sharp edges. In embodiments, the selected region may be pre-processed to identify and modify non-differentiable locations. If a non-differentiable location is identified, small changes may be made to the surface structure of the selected reservoir region to eliminate the non-differentiable locations. For example, a flat area can be represented as smooth low-sloped anticline or incline with one minimum or maximum location in the interior of the flatted area. Additionally, a non-smooth sharp corner can be removed by smoothing the tip of the corner. Critical points can then be identified based on the pre-processed reservoir region, in which all non-differentiable locations have been removed through slight modifications.

During the process of constructing the topological net 504, critical points can be identified by identifying local maxima and minima in the real value function that characterizes the base-seal surface 700. For example, local maxima and minima can be identified by applying a first derivative test or second derivative test over the real value function, $f_R$. In the example provide in FIG. 7, two minimum points would be identified at the bases of the anti-clines 706 and 708 and added to the topological net 710 as critical points 712 and 714. As can be seen in FIGS. 7B and 7C, the base-seal surface 700 forms a saddle, wherein the saddle point 716 is a maximum point in the Q-Q' plane and a minimum in the P-P' plane. Thus, the saddle point 716 is identified at as a critical point 718 and added to the topological net 710.

The critical points used to construct the topological net 712 are used to automatically identify the potential reservoir compartments. For example, the poly segment between the two critical points 714 and 718 (or 712 and 724) can be identified as a potential reservoir compartment. The depth area bounded by the critical points 714 and 718, shown as the left branch on the topological net, is identified as a potential reservoir compartment 720, which is shown in FIG. 7E as a slant-pattern shaded area. The depth area bounded by the critical points 712 and 718, shown as the right branch on the topological net, is identified as a potential reservoir compartment 722, which is shown in FIG. 7E as a vertical-pattern shaded area. In embodiments, each potential compartment can be represented as a poly segment connecting the critical points. During the identification of potential reservoir compartments, the relationships between the potential reservoir compartments can also be identified from the topological net 700. For example, a critical point that is common to two or more poly segments can be identified as a connection between the corresponding potential compartments. Information about the critical points, such as geographical location, depth, and the like, can be used to characterize the connection and their spill/break-over potential as the oil (or water) is charged into the compartments.

In embodiments, the topological net 710 can be constructed by intersecting a depth plane across the base-seal surface 700 starting from the maximum depth of the base-seal surface. The depth plane is a horizontal plane with a constant depth. The depth plane can then be raised in increments through the base-seal 700. At each depth, a set of surface contours is encountered if the depth plane intersects the surface. If one of the surface contours encountered at a certain depth is a single point, the point can be identified as a critical point. Further, if surface contours intersect, the point of intersection can also be identified as a critical point. During the generation of the topological net 710, potential reservoir compartments can be automatically identified based on the identification of particular types of critical points. For example, top saddle critical point would potentially be a location where a spill of fluid could occur from a connected top seal compartment. Referring to the example of FIG. 7B, a single point contour is encountered at the very beginning of the construction at the minimum point 708, which is the minimum location of the reservoir. The minimum point 708 is then identified as a critical point 712 and added to the topological net 710. As the depth plane is raised, the shape and the area of the resulting surface contour changes. If the area of the current contour remains connected to the previous contour, the topological net 710 is left unchanged. The process continues, until the next single point contour is encountered at point 706, which is a local minimum location on the base-seal surface 700. The minimum point 706 is then identified as a critical point 714 and added to the topological net 710. As the depth plane is raised, two contours are generated corresponding to the structure above the minimum points 712 and 714. Eventually, the two contours intersect at the saddle point 716, at which point a branch point 718 is identified and added to the topological net 712. The branch point 718 is a critical point that represents a spill location between reservoir compartments C1 and C2. Additionally, two poly segments between critical points 712 and 718 and critical points 714 and 718 are added to the topological net 710 and identified as potential reservoir compartments. As the depth plane is raised further, the merged contour continues to the top of the base-seal surface.

Embodiments of the present techniques can also be implemented on more complex reservoir geometry, such as discussed with respect to FIGS. 6C and 6D. In FIG. 6C, a single reservoir interval is broken into two fault blocks separated by a fault surfaces. In FIG. 6D, a single reservoir is represented as a volumetric data structure, in which a closed container is bounded by a top-seal horizon and base-seal horizon and some internal areas are excluded. In both cases, a three-dimensional container enclosed by surfaces may be used to construct a corresponding topological net. A topological net for the reservoir structure shown in FIG. 6D is described below, in reference to FIGS. 8A and 8B.

Figure 8A:
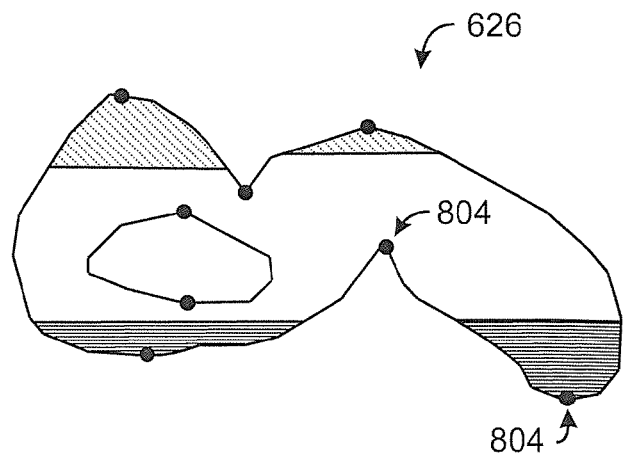
FIGS. 8A and B show a cross section of the bounded reservoir container and a corresponding topological net according to exemplary embodiments of the present techniques.
Figure 8B:
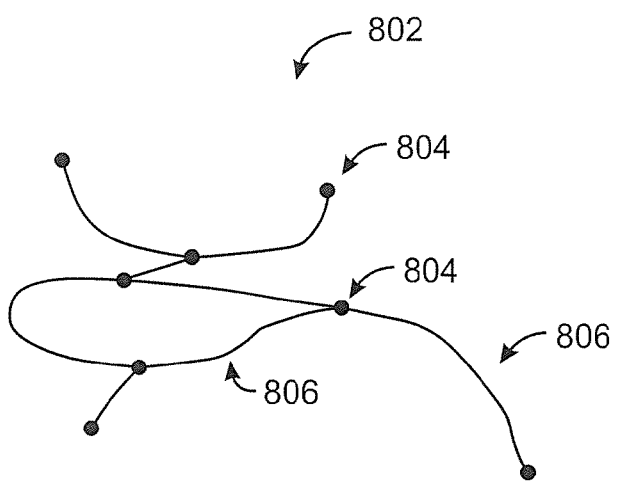

FIGS. 8A-B show a cross section of a bounded reservoir container 626 and a corresponding topological net according to exemplary embodiments of the present techniques. As shown in FIG. 8A, the bounded reservoir container 626 includes two anti-clines and two sync-clines. Depth information about the container can be captured in a real value function, $f_R$. A topological net 802, shown in FIG. 8B, can be generated from the bounded reservoir container 626 by identifying critical points 804 based on the real value function, as described above in relation to FIGS. 7A-7E. In this example, two minimum critical points, two maximum critical points, and four saddle critical points are identified. Each critical point is associated with its corresponding depth. Further, the poly segments 806 can be generated by obtaining depth level data sets from the real value function in specified increments, for example, in increments of 100 feet. Each depth level set is thus represented by a single point on a poly segment along the path from one critical point 804 to another. Representing a point for each depth level contour is a way to disregard the geometrical contour information to a much more abstracted representation such as topological net. The inventive method utilizes the abstraction to characterize and analyze the potential compartments and their relationships from the complex geometry reservoir data structure. Each point on the topological net characterizes the geographical location of the corresponding potential compartment at a particular depth. Based on the locations and depths of the points, the poly segments 806 connecting the critical points 804 may be added to the topological net 802. The entire poly segment 806 on the topological net 802 may be identified as a potential compartment and reflects the spatial locations of the potential compartment.

The resulting topological net, the identifications of the potential compartments, and the relationships between the compartments can be stored, for example, in a non-transitory, computer-readable medium. In embodiments, this data can be used to automatically construct a reservoir connectivity diagram based on the identification of the potential compartments and their relationships. In embodiments, the resulting topological net 802 can be displayed to the user along with the original structural data of the corresponding reservoir. Thus, the topological net 802 may provide visual representations of the topological and geometrical structure, enabling potential compartments and there relationships to be more readily identifiable by the user.

It will be appreciated that the resulting topological net 802 may be a three dimensional structure. In other words, the topological net 802 includes components that extend into or out of the page. In embodiments, the topological net 802 may be rendered by the visualization engine on a display that enables the user to rotate the topological net 802 to better visualize the three-dimensional structure of the topological net 802. In embodiments, the geometry of the reservoir compartments can also be re-constructed from the topological net 802, based on the depth information associated with the critical points 804 and the corresponding depth level sets of the reservoir geometry. In embodiments, the topological net 802 may also be superimposed over a display of the geological model used to generate the topological net 802. In embodiments, the topological net may be used to assist in a reservoir connectivity analysis (RCA), including dynamic reservoir connectivity analysis (DCA). The reservoir connectivity analysis may be better understood with reference to FIGS. 10 and 11.

Figure 9:
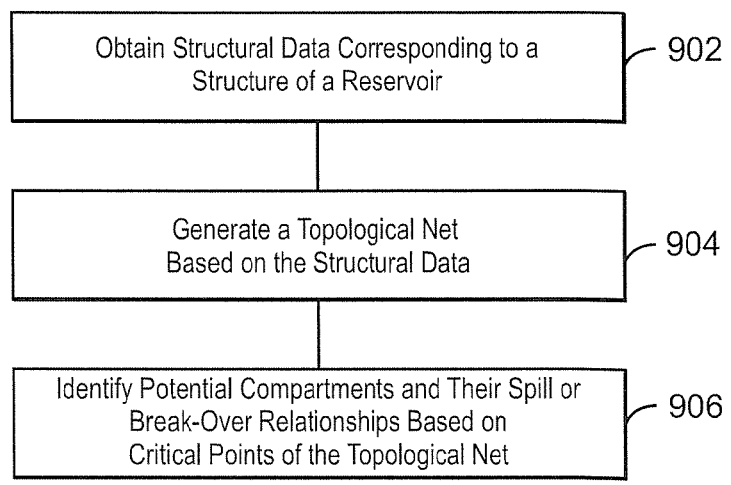
FIG. 9 is a process flow diagram summarizing a method of generating a topological net according to exemplary embodiments of the present techniques.

FIG. 9 is a process flow diagram summarizing a method of identifying potential reservoir compartments, according to exemplary embodiments of the present techniques. The method is referred to by the reference number 900 and may begin at block 902 wherein structural data corresponding to a structure of a reservoir region may be obtained. For example, the structural data may correspond to an entire geological model or a selected reservoir region within the geological model. As described in relation to FIGS. 6A-6D, the structural data can include data about one or more geological objects, including stratigraphic units such as top seal surfaces, base seal surfaces, volumetric data structures, and the like.

At block 904, a topological net may be generated based on the structural data, as described above. For example, a real value function, $f_R$, may be defined for the structural data. In embodiments, the real value function, $f_R$, may be modified to eliminate non-differentiable locations in the selected reservoir region so that the real value function, $f_R$, will be smooth and differentiable in all locations except at the boundary of the selected reservoir region, as described above in relation to FIG. 7.

At block 906, critical points within the selected reservoir region can be identified based on the real value function, $f_R$, as described above in relation to FIG. 7. In embodiments, the critical points can be determined by identifying local maxima and minima of the real value function, $f_R$. In embodiments, the critical points can be determined by incrementally passing a depth plane through the reservoir region and identifying local maxima, minima, and intersection points as described above in relation to FIG. 7. The identified critical points and their corresponding depths are added to the topological net, which may be stored to a non-transitory computer-readable medium. Poly segments connecting the critical points may also be generated and added to the topological net. As described above, each poly segment can be identified as a potential reservoir compartment. The poly segments can be represented and displayed in different ways, depending on the level of abstraction desired for the topological net in a specific implementation. In embodiments, the poly segments can be straight lines connecting the critical points, wherein the vertical distance between the critical points is proportion to the depths associated with each critical point, as shown in the topological net of FIG. 7C. In embodiments, the poly segments can be curved to represent the contour of the corresponding potential compartment as shown in FIG. 8B. The shape of the poly segments can be determined by representing the depth level sets, or surface contours, of the corresponding potential compartment as singular points at specified depth intervals, as described above in relation to FIG. 8B. The points can be connected to form the poly segment.

At block 906, potential compartments and the relationships between compartments may be identified based on critical points of the topological net. The poly segments between critical points can be identified as potential reservoir compartments. The critical points can be identified as connections between reservoir compartments. Further, although shown as separate blocks, it will be appreciated that the identification of potential reservoir compartments and their relationships can be performed during the generation of the topological net. In embodiments, several topological nets can be generated based on different selections of the reservoir, in which case the steps 902 to 908 may be repeated for each selected reservoir region. In embodiments, the identifications of the potential reservoir compartments and the relationships between the reservoir compartments can be used to generate a reservoir connectivity diagram, as shown in FIG. 10.

Figure 10:
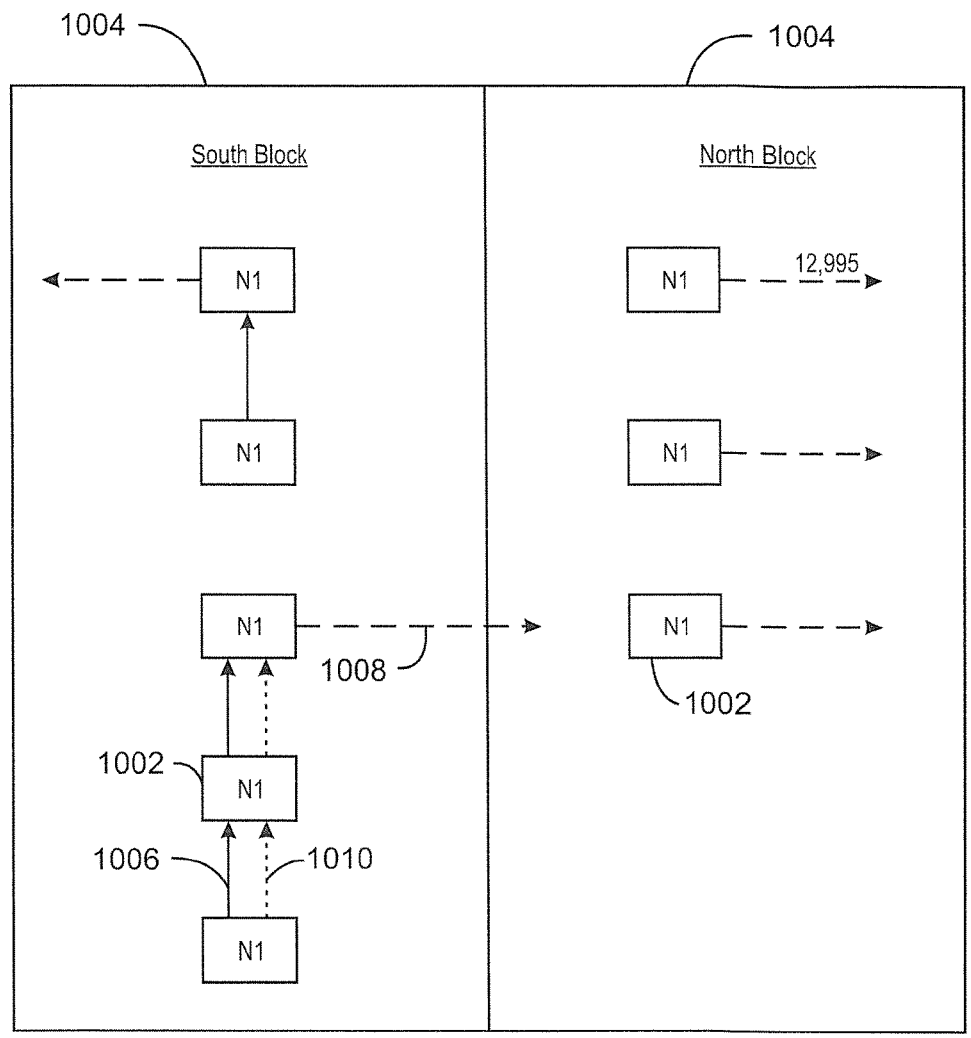
FIG. 10 is an example of a reservoir connectivity diagram.

FIG. 10 is an example of a reservoir connectivity diagram. The reservoir connectivity diagram 1000 can include a plurality of potential compartments 1002, which are represented as blocks labeled N1. Each of the potential compartments may correspond to a poly segment from the corresponding topological net. The potential compartments can be organized into one or more fault blocks 1004 separated, for example, by a fault. The fluid travel between potential compartments can be indicated by arrows between the blocks. In the reservoir connectivity diagram 1000 of FIG. 10, a solid arrow 1006 is used to represent an erosional connection between compartments, a dashed arrow 1008 is used to indicate a spill or break-over point between compartments, and a dotted arrow 1010 is used to indicate fluid travel across a fault juxtaposition. Each of the connections between the potential compartments may correspond to a critical point of the corresponding topological net. The type of connection between a set of potential compartments and depth of the connection can be determined from geological data of the corresponding critical point.

An RCA model, such as the one shown in FIG. 10, can provide a framework to create a logically permissible but non-unique interpretation of the potential compartments and connections in a given reservoir using geological data, production data, and their associated interpretation. The geological data and production data can include, rock types, fluid properties, pressure profiles such as shown in FIG. 4, actual flow rates, and the like. The connectivity interpretations provided by the geological data and production data can be compared to the expected pressures and flow rates that would be provided by the reservoir connectivity indicated by the reservoir connectivity diagram 1000. Reconciling these interpretations enables one to determine an actual reservoir structure that best fits the geological data and production data. The actual reservoir structure can then be used to guide future production, for example, placement of new well bores, and the like.

In an exemplary embodiment, potential compartments can be defined and added to the connectivity diagram 1000 based on one or more topological nets. All of the potential compartments 1002 pertaining to a reservoir may be included in the connectivity diagram, including system exit points, leak points, and spill points for gas, oil, and water. Within a potential compartment, the contact between fluids and production data, such as pressure, can be used to check the dynamic of the compartmentalization in production scale.

It will be appreciated that the topological net can also be used in conjunction with other techniques for analyzing reservoirs. For example, in embodiments, the topological net can be used to develop a compartment matrix that shows which compartments share a fluid column in original pressure communication. In embodiments, based on the data provided by the topological net, graph analysis algorithms such as shortest path and maximum flow algorithms could be used to derive additional information about reservoir connectivity, such as the location of weak links among connected compartments or the locations to inject water in order to increase the production, etc. Further, since the topological net includes depth data and linkages to the compartment geometry, one can also mark the gas/oil/water contact movements and/or their pressures gradients on the poly segments of the topological net to assist the production scale connectivity analysis. In embodiments, the three-dimensional shared earth model can be used to annotate the topological net together with the three-dimensional representation of the reservoir geometry for interactive visualization and processing of the RCA/DCA models.

Figure 11:
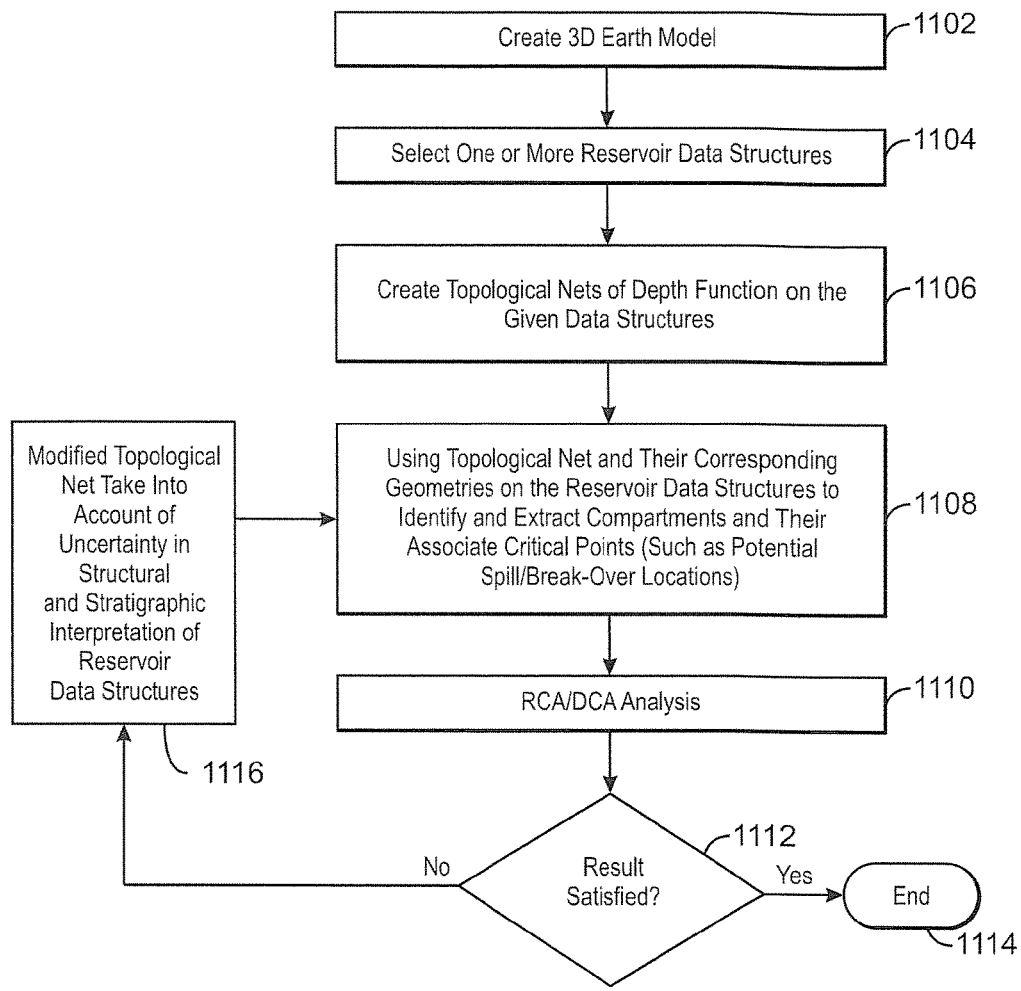
FIG. 11 is a process flow diagram of a method of performing reservoir connectivity analysis according to exemplary embodiments of the present techniques.

FIG. 11 is a process flow diagram of a method of performing reservoir connectivity analysis according to exemplary embodiments of the present techniques. The method is referred to by the reference number 1100 and may begin at block 1102. At block 1102, a three-dimensional geological model of a reservoir is obtained. The geological model may be an earth model that represents a three-dimensional representation of one or more potential reservoirs. The geological model can be generated from various geological data and engineering data using computational, analytical, and interpretive methods such as seismic pattern recognition and expert analysis of the geological structure, rock properties, core samples, and the like. In embodiments, the three-dimensional geological model may be rendered on a computer with visualization capabilities, such as the commercial product Gocad (Geological Object Computer Aided Design) developed by the Gocad Research Group. The computer system could be a single processor unit or preferably a networked multi-processor system, as described in relation to FIG. 13.

At block 1104, one or more of the reservoir data structures may be selected for further processing, as described in relation to FIG. 6. The selected reservoir data structures can include one or more geological objects, including stratigraphic units such as top seal surfaces, base seal surfaces, volumetric data structures, and the like. In some embodiments, one or more fault surfaces may also be selected, in which case the boundaries of compartments could also determined by the structural features of the one or more faults.

At block 1106 a topological net may be generated as summarized above in relation to FIG. 9. At block 1108, the topological net may be used to identify potential compartments and their relationships. In embodiments, the potential compartments, critical points, and other data associated with the topological net, such as depth of critical points, may be used to generate a reservoir connectivity diagram as described in relation to FIG. 10. Further, several reservoir regions may be selected from the shared earth model, in which case blocks 1102 to 1108 may be iteratively repeated until all of the selected reservoir regions are processed.

At block 1110, the topological nets and/or corresponding connectivity diagram are used to perform the reservoir connectivity analysis. During the reservoir connectivity analysis the reservoir connectivity model could be analyzed to address the issues of uncertainty in structural and stratigraphic interpretations as well as fluid contact movements during the production activities. For example, the compartment identification and spill relations would be affected by the whether or not an area of fault juxtaposition is sealed. Another example is that the geometry uncertainty in some areas of top/base-seal surfaces interpretation may result in a different topology structure. Uncertainties may be resolved by comparing geological data such as measured pressures against the hypothetical pressures that would be expected based on the given connectivity diagram or topological net. Production data such as depleting pressure or flow rates from production wells may also used to check the consistency of the RCA/DCA model.

At block 1112, a determination is made regarding whether inconsistencies have been identified between the measured and expected data. If no inconsistencies are identified, the process flow may advance to block 1114 and terminate. The resulting geologic model provided by the reservoir connectivity analysis or the topological nets can then be used to guide future production decisions, such as whether an and where to drill new well bores. If inconsistencies are identified, the process flow may advance to block 1116, wherein an attempt may be made to reconcile the inconsistencies.

At block 1116, the geologic structure of the reservoir data can be modified to try to provide a better fit between observations and the reservoir connectivity model. The user can specify changes to be made to the geologic structure and thus the reservoir connectivity diagram by specifying certain changes to the one topological net. For example, fault juxtaposition may be changed from permeable to sealed by eliminating one or more connected critical points and their associated poly segments from the topological net. Conversely, a sealed fault can be changed to leaky at a certain depth, which would add a critical point and may result in potential compartments being added to the topological net. After the geologic structure of the reservoir data is modified, process flow can return to block 1108 and a new reservoir connectivity diagram can be generated based on the modified topological net.

EXAMPLES

FIGS. 12A-G are diagrams that show an example of using a topological net to conduct reservoir connectivity analysis according to exemplary embodiments of the present techniques. As shown in FIGS. 12A-D, the reservoir connectivity analysis uses a topological analysis of selected structure maps to generate a topological net. The topological net is used to identify potential compartments on which to conduct reservoir connectivity analysis.

FIG. 12A shows an exemplary structure map of a reservoir region 1200 selected for analysis. The selected reservoir region 1200 in this example is an anticline reservoir with a channel axis 1202 and two anticline structures 1204 and 1206. In this example, only two heavy fluids are considered. Oil is represented with slanted pattern and water is represented with a vertical line pattern. A cross-sectional view of the structure is shown in FIG. 12B. From the geological data corresponding to the structure shown in FIGS. 12A and 12B, a topological net 1208 is constructed as described above. The topological net 1208 is shown in FIG. 12C and includes three maximum critical points 1210, two minimum critical points 1212, and two saddle critical points 1212 which were identified during the generation of the topological net 1208. The poly segments 1214 represent potential compartments. The reservoir conductivity analysis can then be performed with the aid of the topological net 1208.

To simply the connectivity analysis, the potential compartments shown in the topological net 1208 can be merged in the initial oil/water connectivity analysis. Thus, two compartments 1216 and 1218 can be extracted from the topological net 1208, added to a reservoir connectivity diagram, and connected by a spill control location corresponding to the spill point 1220 shown in the topological net 1208. Without the geometrical complexity of the original structure map, the topological net 1208 could be used to indicate the possibility that oil/water pressure gradients on both branches of the compartments 1216 and 1218 will maintain equilibrium without any additional charge of fluids. However, continued oil charge to compartment 1216 may result in pressure gradient changes in different branches of the compartments 1216 and 1218. For example, FIG. 12E shows an oil charge introduced from the right hand side of the channel 1202 to displace water as indicated by the arrow 1222. Since oil density is lighter than water, the charged oil would be trapped on the top of the anticline 1206 corresponding to the potential compartment 1216. As shown in FIG. 12F, oil continues to collect in the compartment 1216. When the oil level reaches the spill point 1220, as shown in FIG. 12G, the oil would than spill over to the compartment 1218 via the spill point 1220.

Figure 13:
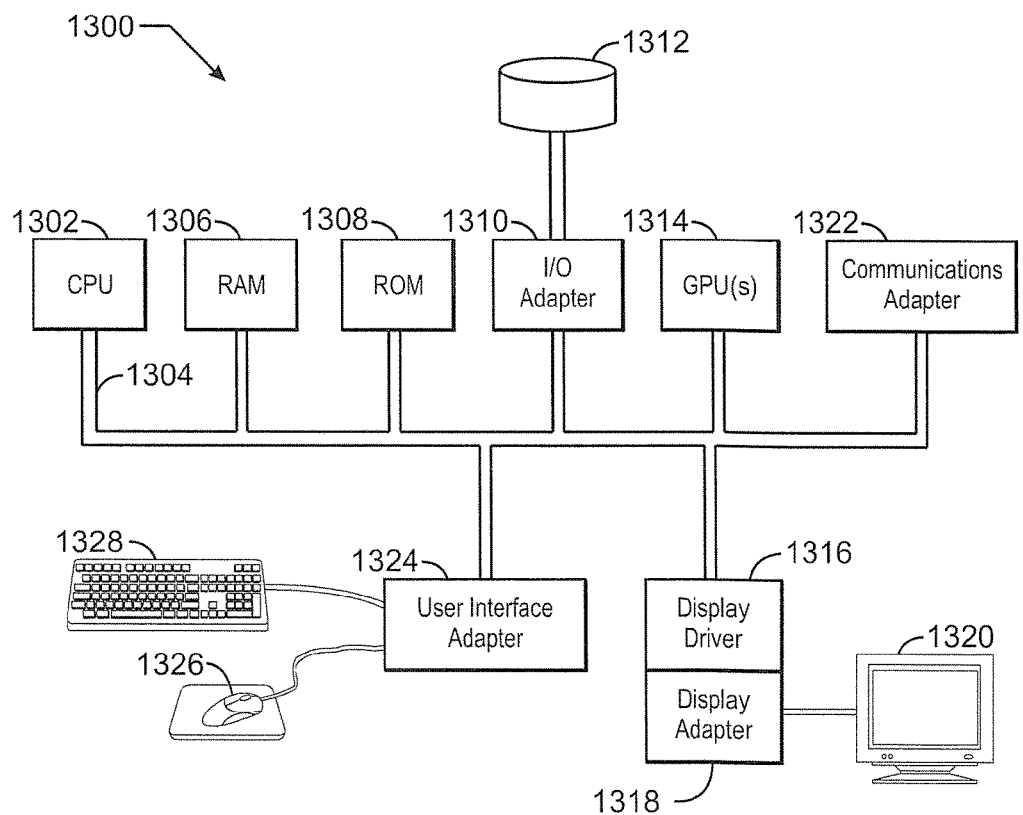
FIG. 13 is a block diagram of a computer system that may be used to generate a topological tree for a reservoir connectivity analysis according to exemplary embodiments of the present techniques.

FIG. 13 is a block diagram of a computer system that may be used to generate a topological tree for a reservoir connectivity analysis according to exemplary embodiments of the present techniques. A central processing unit (CPU) 1302 is coupled to system bus 1304. The CPU 1302 may be any general-purpose CPU, although other types of architectures of CPU 1302 (or other components of exemplary system 1300) may be used as long as CPU 1302 (and other components of system 1300) supports the inventive operations as described herein. Those of ordinary skill in the art will appreciate that, while only a single CPU 1302 is shown in FIG. 13, additional CPUs may be present. Moreover, the computer system 1300 may comprise a networked, multi-processor computer system that may include a hybrid parallel CPU/GPU system. The CPU 1302 may execute the various logical instructions according to various exemplary embodiments. For example, the CPU 1302 may execute machine-level instructions for performing processing according to the operational flow described above in conjunction with FIGS. 9 and 11.

The computer system 1300 may also include computer components such as computer-readable media. Examples of computer-readable media include a random access memory (RAM) 1306, which may be SRAM, DRAM, SDRAM, or the like. The computer system 1300 may also include additional computer-readable media such as a read-only memory (ROM) 1308, which may be PROM, EPROM, EEPROM, or the like. RAM 1306 and ROM 1308 hold user and system data and programs, as is known in the art. The computer system 1300 may also include an input/output (I/O) adapter 1310, a communications adapter 1322, a user interface adapter 1316, and a display adapter 1318. In an exemplary embodiment of the present techniques, the display adaptor 1318 may be adapted to provide a 3D representation of a 3D earth model. Moreover, an exemplary embodiment of the display adapter 1318 may comprise a visualization engine that is adapted to provide a visualization of extracted data, such as geological structures and topological nets, among others. The I/O adapter 1310, the user interface adapter 1316, and/or communications adapter 1322 may, in certain embodiments, enable a user to interact with computer system 1300 in order to input information.

The I/O adapter 1310 may connects a storage device(s) 1312, such as one or more of hard drive, compact disc (CD) drive, floppy disk drive, tape drive, etc. to computer system 1300. The storage device(s) may be used when RAM 1306 is insufficient for the memory requirements associated with storing data for operations of embodiments of the present techniques. The data storage of the computer system 1300 may be used for storing information and/or other data used or generated as disclosed herein. User interface adapter 1316 couples user input devices, such as a keyboard 1324, a pointing device 1314 and/or output devices to the computer system 1300. The display adapter 1318 is driven by the CPU 1302 to control the display on a display device 1320 to, for example, display information or a representation pertaining to a portion of a subsurface region under analysis.

The architecture of system 1300 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

In an exemplary embodiment of the present techniques, input data to the computer system 1300 may comprise geologic and geophysical data volumes/models such as seismic volumes, geological models and reservoir models. Input data may additionally comprise engineering data, such as drilled well paths and/or planned well paths. Computational implementations according to exemplary embodiments of the present techniques may comprise connections and/or access to computational implementations of processes to model and investigate the engineering and reservoir model properties and path creation method. Relevant connections may include facilities to perform geological model analysis, reservoir connectivity analysis, engineering analysis, and the like.

The present techniques may be susceptible to various modifications and alternative forms, and the exemplary embodiments discussed above have been shown only by way of example. However, the present techniques are not intended to be limited to the particular embodiments disclosed herein. Indeed, the present techniques include all alternatives, modifications, and equivalents falling within the spirit and scope of the appended claims.

What is claimed is:

1. A method of identifying compartments of a reservoir structure, the method comprising:
    obtaining structural data defining a reservoir structure, wherein the structural data represents a subsurface region containing at least a portion of a reservoir;
    generating a topological net based on the structural data in a computer system, the topological net comprising critical points and poly segments connecting the critical points,
    wherein the generation of the topological net comprises:
        (i) defining a real value function that maps the reservoir structure to depth values;
        (ii) computing one or more local minima, one or more local maxima, or any combination thereof based on the real value function;
        (iii) identifying one of the one or more local minima, one or more local maxima, and any combination thereof as the critical points; and
        (iv) representing the critical points in the topological net;
    identifying potential compartments of the reservoir structure based on at least the critical points in the topological net in the computer system;
    automatically identifying spill or break-over relationships among the potential compartments based on at least the critical points in the topological net; and
    displaying or storing a representation based on the identified spill or break-over relationships.

2. The method recited in claim 1, wherein the critical points comprise a minimum critical point, a maximum critical point, a top saddle critical point, or a base saddle critical point.

3. The method recited in claim 2, wherein the top saddle critical point is identified as a spill relation between the potential compartments corresponding to the top saddle critical point.

4. The method recited in claim 2, wherein the base saddle critical point is identified as a break-over relation between the potential compartments corresponding to the base saddle critical point.

5. The method recited in claim 1, wherein the poly segments correspond to reservoir regions of the reservoir structure.

6. The method recited in claim 5, wherein if the critical points comprise a top saddle critical point and a maximum critical point, the reservoir region corresponding to the poly segment connecting by the critical points is identified as one of the potential compartments.

7. The method recited in claim 5, wherein if the critical points comprise a base saddle critical point and a minimum critical point, the reservoir region corresponding to the poly segment connecting the critical points is identified as one of the potential compartments.

8. The method recited in claim 1, wherein a point in one of the poly segments corresponds to a level set contour of the reservoir structure.

9. The method recited in claim 1, wherein points on the poly segments represent structural contours, which are generated by obtaining depth level sets of the structural data from a real value function that maps to depths ranging from minimum depth to maximum depth of the structural data.

10. The method recited in claim 1, comprising identifying critical points of the topological net by passing a plane of constant depth through the reservoir structure to obtain depth level contours and identifying locations where the depth level contours intersect.

11. The method recited in claim 1, wherein the structural data comprises geological surfaces, seismic data, geological models, reservoir models, or some combination thereof.

12. The method recited in claim 1, comprising adding the potential compartments to a reservoir connectivity diagram.

13. The method recited in claim 12, comprising adding the spill or break-over relationships to the reservoir connectivity diagram.

14. The method recited in claim 1, further comprising using the representation to determine one or more locations for drilling a well in the reservoir.

15. A method of performing a reservoir connectivity analysis comprising:
obtaining structural data defining a reservoir structure, wherein the structural data represents a subsurface region containing at least a portion of a reservoir;
generating a topological net based on the structural data in a computer system, the topological net comprising critical points and poly segments connecting the critical points,
wherein the generation of the topological net comprises:
(i) defining a real value function that maps the reservoir structure to depth values;
(ii) computing one or more local minima, one or more local maxima, or any combination thereof from the real value function;
(iii) identifying one of the one or more local minima, one or more local maxima, and any combination thereof as the critical points; and
(iv) associating the critical points in the topological net;
identifying a potential compartment of the reservoir structure based on at least the critical points in the topological net in the computer system;
adding the potential compartment to a reservoir connectivity diagram;
comparing measured pressure data with expected pressure data, wherein the expected pressure data is generated based on the reservoir connectivity diagram; and
displaying or storing a representation based on the comparison of the measured pressure data with expected pressure data.

16. The method recited in claim 15, comprising modifying the topological net if the measured pressure data is inconsistent with the expected pressure data and generating a modified reservoir connectivity diagram based on the modified topological net.

17. A system for analyzing reservoir structure data, comprising:
a processor; and
a non-transitory, computer-readable medium comprising code configured to direct the processor to:
obtain structural data corresponding to defining a reservoir structure, wherein the structural data represents a subsurface region containing at least a portion of a reservoir;
generate a topological net based on the structural data, the topological net comprising critical points and poly segments connecting the critical points, wherein the generation of the topological net comprises code configured to direct the processor to:
(i) define a real value function that maps the reservoir structure to a depth value;
(ii) calculate one or more local minima, one or more local maxima, and any combination thereof;
(iii) identify one of the one or more local minima, one or more local maxima, and any combination thereof as the critical points; and
(iv) associate the critical points in the topological net;
identify potential compartments of the reservoir structure based on at least the critical points in the topological net;
generate the poly segment by obtaining depth level sets of the structural data from the real value function that maps to depths ranging from minimum depth to maximum depth of the structural data; and
display or store a representation based on the identified potential compartments and the topological net.

18. The system recited in claim 17, wherein the code configured to direct the processor to identify potential compartments identifies one of the poly segments between two or more of the critical points as one of the potential compartments.

19. The system recited in claim 17, wherein the non-transitory, computer-readable medium comprises code configured to direct the processor to identify one of the critical points as a spill or break-over connection between the potential compartments corresponding to the poly segments connected by the critical point.

20. The system recited in claim 17, comprising a visualization engine configured to provide a visual display of a reservoir and overlay the topological net over the visual display of the reservoir.

21. The system recited in claim 17, wherein the non-transitory, computer-readable medium comprises code configured to direct the processor to add the potential compartments and relationships between compartments to a reservoir connectivity diagram.

22. The system recited in claim 17, wherein the critical points comprise a minimum critical point, a maximum critical point, a top saddle critical point, or a base saddle critical point and the poly segments correspond to regions of the reservoir.

23. The system recited in claim 17, wherein points on the poly segments represent structural contours, which are generated by obtaining depth level sets of the structural data from a real value function that maps to depths ranging from minimum depth to maximum depth of the structural data.

24. A method of modeling compartments in a subsurface region, the method comprising:
obtaining structural data defining a reservoir structure in the subsurface region;
generating a topological net based on the structural data in a computer system, the topological net comprising critical points and poly segments connecting the critical points,
wherein the generation of the topological net comprises:
(v) defining a real value function that maps the reservoir structure to depth values;
(vi) computing one or more local minima, one or more local maxima, or any combination thereof based on the real value function;
(vii) identifying one of the one or more local minima, one or more local maxima, and any combination thereof as the critical points; and
(viii) representing the critical points in the topological net;
identifying potential compartments of the reservoir structure based on at least the critical points in the topological net in the computer system;
automatically identifying spill or break-over relationships among the potential compartments based on at least the critical points in the topological net; and constructing a reservoir connectivity diagram based on the identification of the potential compartments and the spill or break-over relationships;
displaying the reservoir connectivity diagram.

\* \* \* \* \*